(12) United States Patent
Koyama et al.

(10) Patent No.: US 7,180,496 B2
(45) Date of Patent: *Feb. 20, 2007

(54) LIQUID CRYSTAL DISPLAY DEVICE AND METHOD OF DRIVING THE SAME

(75) Inventors: Jun Koyama, Kanagawa (JP); Shunpei Yamazaki, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 73 days.

This patent is subject to a terminal disclaimer.

(21) Appl. No.: 09/930,956

(22) Filed: Aug. 17, 2001

(65) Prior Publication Data

US 2002/0021295 A1  Feb. 21, 2002

(30) Foreign Application Priority Data

Aug. 18, 2000  (JP) .............................. 2000-249083

(51) Int. Cl.
G09G 3/36  (2006.01)

(52) U.S. Cl. ........................................ 345/98; 345/205

(58) Field of Classification Search .......... 345/87–104, 345/50–51, 205

See application file for complete search history.

(56) References Cited

U.S. PATENT DOCUMENTS

| | | | |
|---|---|---|---|
| 4,432,610 A | * | 2/1984 | Kobayashi et al. ...... 350/331 R |
| 4,752,118 A | * | 6/1988 | Johnson ...................... 350/334 |
| 4,773,738 A | | 9/1988 | Hayakawa et al. |
| 4,996,523 A | | 2/1991 | Bell et al. |
| 5,091,722 A | | 2/1992 | Kitajima et al. |
| 5,200,846 A | | 4/1993 | Hiroki et al. |

(Continued)

FOREIGN PATENT DOCUMENTS

CN  1 337 669  2/2002

(Continued)

OTHER PUBLICATIONS

U.S. Appl. No. 09/916,306, filed Jul. 30, 2001, Koyama.

(Continued)

*Primary Examiner*—Amr A. Awad
*Assistant Examiner*—Tom Sheng
(74) *Attorney, Agent, or Firm*—Fish & Richardson P.C.

(57) ABSTRACT

A liquid crystal display device with low power consumption is provided by using a driver circuit and a pixel that have novel circuit structures. In a liquid crystal display device using n (n is a natural number and satisfies $n \geq 2$) bit digital video signals to display an image, n×m (m is a natural number) memory circuits and n×k (k is a natural number) non-volatile memory circuits are provided in each pixel, thereby giving the device a function of storing m frames of digital video signals in the memory circuits and a function of storing k frames of digital video signals in the non-volatile memory circuits. Once stored in the memory circuits, the digital video signals are repeatedly read out for every new frame to display a still image, so that driving of a source signal line driver circuit can be stopped during still image display. Moreover, digital video signals stored in the non-volatile memory circuits are kept stored after power supply is shut off and hence the image of the stored data can immediately be displayed next time the display device is turned on.

54 Claims, 23 Drawing Sheets

U.S. PATENT DOCUMENTS

| | | | |
|---|---|---|---|
| 5,225,823 A | | 7/1993 | Kanary et al. |
| 5,247,190 A | | 9/1993 | Friend et al. |
| 5,339,090 A | | 8/1994 | Crossland et al. |
| 5,349,366 A | * | 9/1994 | Yamazaki et al. ............ 345/92 |
| 5,424,752 A | | 6/1995 | Yamazaki et al. |
| 5,471,225 A | * | 11/1995 | Parks ......................... 345/98 |
| 5,479,283 A | | 12/1995 | Kaneko et al. |
| 5,600,169 A | | 2/1997 | Burgener et al. |
| 5,642,129 A | | 6/1997 | Zavracky et al. |
| 5,699,078 A | * | 12/1997 | Yamazaki et al. .......... 345/147 |
| 5,712,652 A | | 1/1998 | Sato et al. |
| 5,771,031 A | | 6/1998 | Kinoshita et al. |
| 5,793,344 A | * | 8/1998 | Koyama ...................... 345/87 |
| 5,798,746 A | | 8/1998 | Koyama |
| 5,907,313 A | | 5/1999 | Kubota et al. |
| 5,945,866 A | * | 8/1999 | Fonash et al. .............. 327/427 |
| 5,945,972 A | * | 8/1999 | Okumura et al. ............ 345/98 |
| 5,959,598 A | | 9/1999 | McKnight |
| 5,990,629 A | | 11/1999 | Yamada et al. |
| 6,115,019 A | * | 9/2000 | Perner ......................... 345/98 |
| 6,165,824 A | | 12/2000 | Takano et al. |
| 6,246,386 B1 | * | 6/2001 | Perner ......................... 345/90 |
| 6,259,846 B1 | | 7/2001 | Roach et al. |
| 6,274,887 B1 | | 8/2001 | Yamazaki et al. |
| 6,333,737 B1 | | 12/2001 | Nakajima |
| 6,344,843 B1 | | 2/2002 | Koyama et al. |
| 6,356,028 B1 | | 3/2002 | Legagneux et al. |
| 6,366,026 B1 | | 4/2002 | Saito et al. |
| 6,380,876 B1 | | 4/2002 | Nagao |
| 6,384,818 B1 | | 5/2002 | Yamazaki et al. |
| 6,392,618 B1 | | 5/2002 | Kimura |
| 6,441,829 B1 | | 8/2002 | Blalock et al. |
| 6,445,368 B1 | | 9/2002 | Nakajima |
| 6,456,267 B1 | * | 9/2002 | Sato et al. .................... 345/92 |
| 6,496,130 B2 | | 12/2002 | Nagao |
| 6,535,192 B1 | | 3/2003 | Sung et al. |
| 6,542,139 B1 | | 4/2003 | Kanno |
| 6,545,654 B2 | | 4/2003 | Jacobsen et al. |
| 6,549,196 B1 | | 4/2003 | Taguchi et al. |
| 6,556,176 B1 | | 4/2003 | Okuyama et al. |
| 6,563,480 B1 | | 5/2003 | Nakamura |
| 6,630,916 B1 | * | 10/2003 | Shinoda ....................... 345/60 |
| 6,636,194 B2 | | 10/2003 | Ishii |
| 6,664,943 B1 | | 12/2003 | Nakajima et al. |
| 6,670,938 B1 | | 12/2003 | Yoshida |
| 6,731,264 B2 | | 5/2004 | Koyama et al. |
| 6,738,054 B1 | | 5/2004 | Yamaguchi |
| 6,747,623 B2 | | 6/2004 | Koyama |
| 6,750,836 B1 | | 6/2004 | Katayama et al. |
| 6,765,562 B2 | | 7/2004 | Yamazaki et al. |
| 6,774,876 B2 | | 8/2004 | Inukai |
| 2001/0005193 A1 | | 6/2001 | Yokoyama |
| 2002/0003521 A1 | | 1/2002 | Matsueda et al. |
| 2002/0018029 A1 | | 2/2002 | Koyama |
| 2002/0021274 A1 | | 2/2002 | Koyama et al. |
| 2002/0021295 A1 | | 2/2002 | Koyama et al. |
| 2002/0024054 A1 | | 2/2002 | Koyama et al. |
| 2002/0024485 A1 | | 2/2002 | Koyama |
| 2002/0036604 A1 | | 3/2002 | Yamazaki et al. |
| 2002/0039087 A1 | | 4/2002 | Inukai |
| 2002/0041266 A1 | | 4/2002 | Koyama et al. |
| 2002/0057244 A1 | | 5/2002 | Koyama et al. |
| 2002/0089483 A1 | | 7/2002 | Yamazaki et al. |
| 2002/0113763 A1 | | 8/2002 | Koyama |
| 2003/0071772 A1 | | 4/2003 | Kimura |
| 2004/0183766 A1 | | 9/2004 | Koyama et al. |
| 2004/0222955 A1 | | 11/2004 | Koyama |

FOREIGN PATENT DOCUMENTS

| | | |
|---|---|---|
| EP | 0 999 595 | 5/2000 |
| EP | 1 098 290 | 5/2001 |
| EP | 1098290 | 5/2001 |
| EP | 1182638 A2 | 2/2002 |
| JP | 04-350627 | 12/1992 |
| JP | 06-102530 | 4/1994 |
| JP | 08-101609 | 4/1996 |
| JP | 8-101669 | 4/1996 |
| JP | 08-194205 | 7/1996 |
| JP | 08-286170 | 11/1996 |
| JP | 10-092576 | 4/1998 |
| JP | 10-214060 | 8/1998 |
| JP | 10-232649 | 9/1998 |
| JP | 10-247735 | 9/1998 |
| JP | 10-253941 | 9/1998 |
| JP | 10-312173 | 11/1998 |

OTHER PUBLICATIONS

U.S. Appl. No. 09/912,596, filed Jul. 26, 2001, Koyama.

U.S. Appl. No. 09/923,433, filed Aug. 8, 2001, Koyama et al.

Shimoda et al.; "Current Status and Future of Light-Emitting Polymer Display Driven by Poly-Si TFT"; *SID 99 Digest*; pp. 372-375; 1999.

Shimoda et al.; "High Resolution Light Emitting Polymer Display Driven by Low Temperature Polysilicon Thin Film Transistor with Integrated Driver"; *Asia Display 98*; pp. 217-220; 1998.

Han et al.; "Green OLED with low temperature poly Si TFT"; *EuroDisplay '99 (The 19th —International Display Research Conference—Late-news papers)*; pp. 27-30; Sep. 6-9, 1999.

Ernst Lüder, Euro Display '99; "The 19th International Display Research Conference," Sep. 6-9, 1999, Berlin, Germany, pp. 33-37.

*A 4.0-in. PdySi TFT-LCD with Integrated 6-bit Digital Data Driver Using CGS Technology*; Koyama et al., 1999 International Workshop on Active-Matrix Liquid-Crystal Displays—TFT Technologies and Related Materials-, Digest of Technical Papers, AM-LCD 99, AMP 1-3/PP. 29-32 (Jul. 14-16, 1999).

Tsutsui et al., "Electroluminescence In Orgainc Thin Films," *Photochemical Processes in Organized Molecular Systems*, pp. 437-450, Sep. 9, 1990.

Baldo et al., "Very high-efficiency green organic light-emitting devices based on electrophosphorescence," *Applied Physics Letters* vol. 75, No. 1, pp. 4-6, Jul. 5, 1999.

Baldo et al., "Highly efficient phosphorescent emission from organic electroluminescent devices," *Nature* vol. 395, pp. 151-154, Sep. 10, 1998.

Tsutsui et al., "High Quantum Efficiency in Organic Light-Emitting Devices with Iridium-Complex as a Triplet Emissive Center," *Japanese Journal of Applied Physics* vol. 38/Part 2, No. 12B, pp. L1502-L1504, Dec. 15, 1999.

Schenk, et al., "Polymers for Light Emitting Diodes," *Proceedings of the 19th International Display Research Conference* pp. 33-37, Sep. 6, 1999.

Office Action from U.S. Appl. No. 09/923,433, dated Sep. 8, 2004.

Office Action from U.S. Appl. No. 09/923,433, dated Jul. 28, 2004.

Office Action (U.S. Appl. No. 09/916,306), dated Jan. 25, 2005, 15 pages.

Office Action (U.S. Appl. No. 09/931,061), dated Mar. 22, 2005, 16 pages.

* cited by examiner

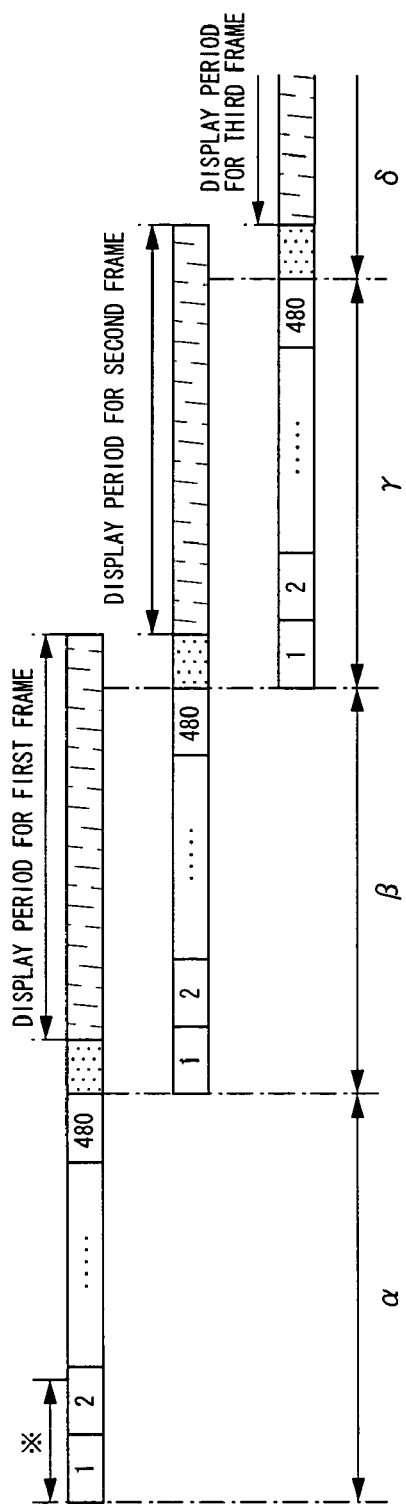
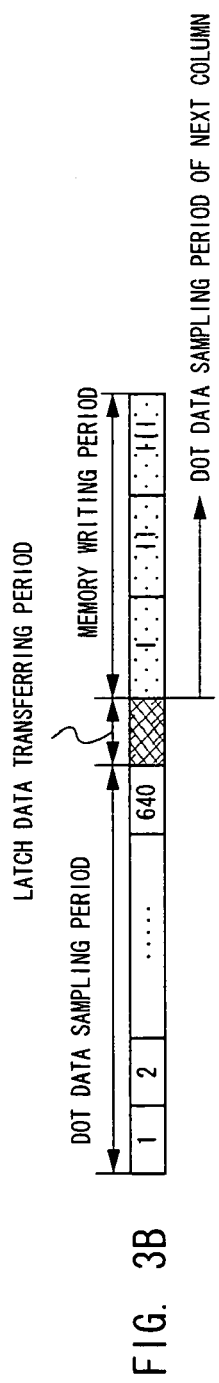
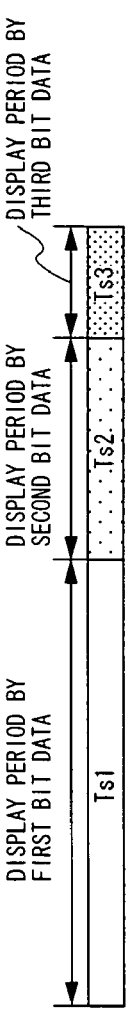
FIG. 3A
FIG. 3B
FIG. 3C

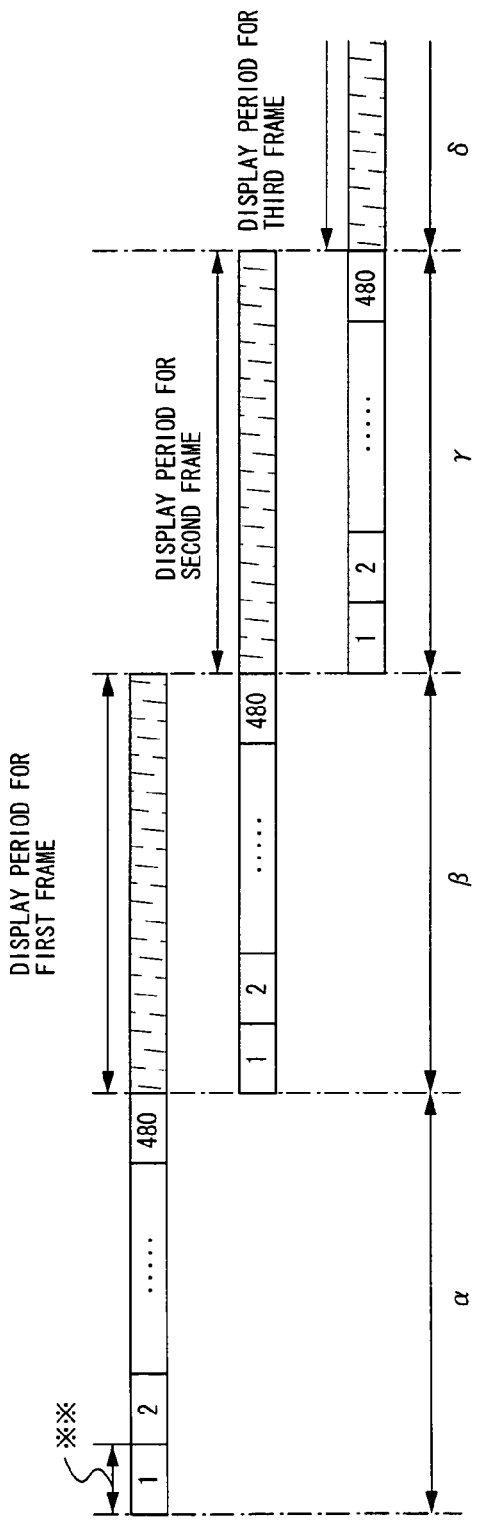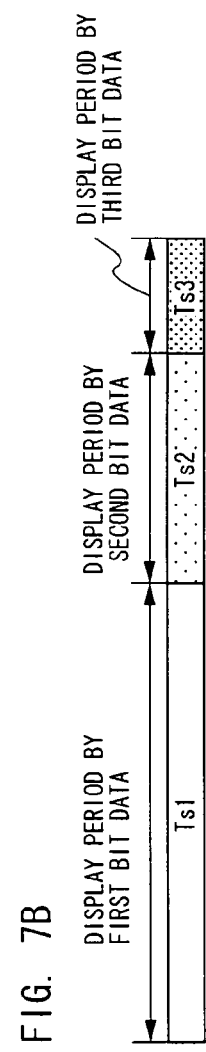
FIG. 7A
FIG. 7B
FIG. 7C

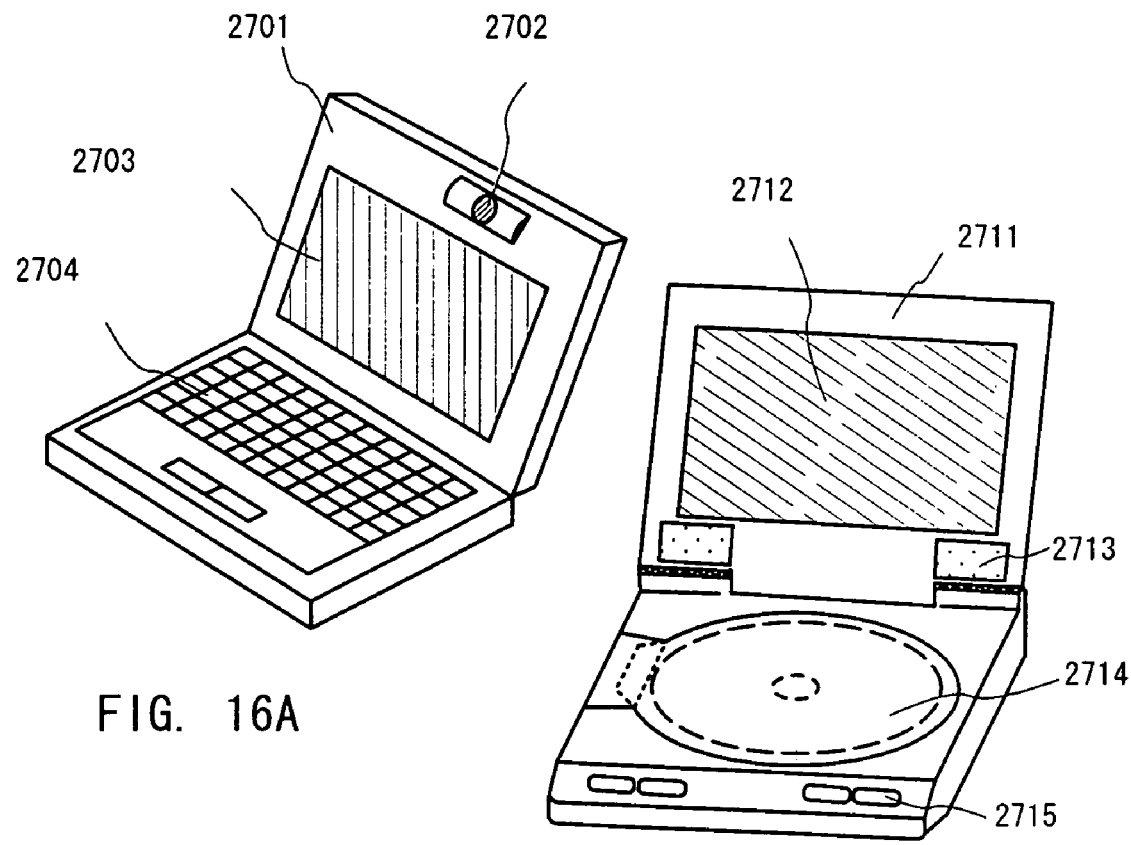
FIG. 16A
FIG. 16B
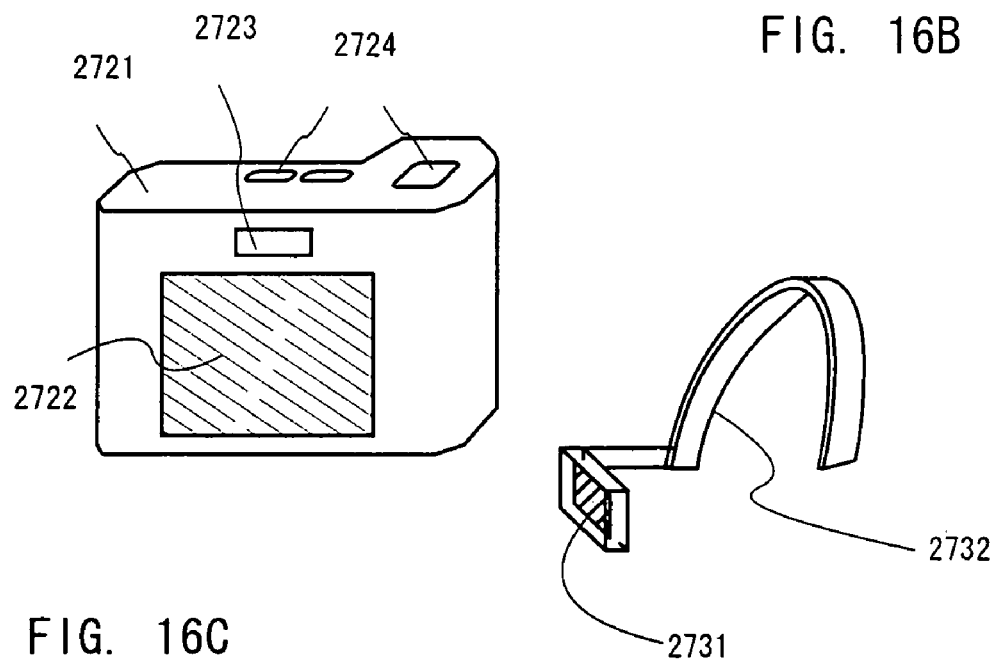
FIG. 16C
FIG. 16D

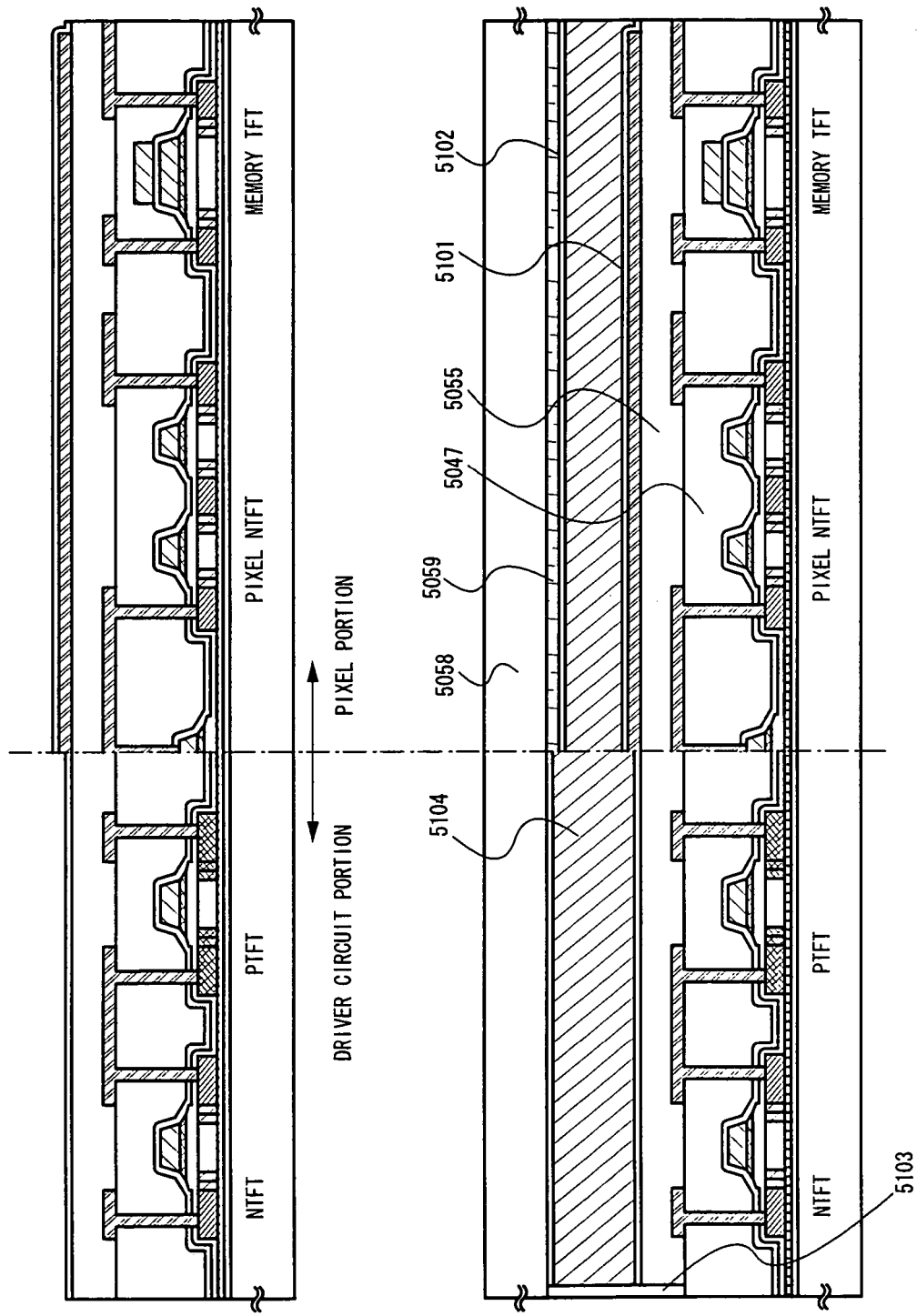

LIQUID CRYSTAL DISPLAY DEVICE AND METHOD OF DRIVING THE SAME

BACKGROUND OF THE INVENTION

Field of the Invention

The present invention relates to a driver circuit of a semiconductor display device (hereinafter referred to as display device) and a display device using a driver circuit, specifically to a driver circuit of an active matrix display device having thin film transistors that are formed on an insulator and an active matrix display device using a driver circuit. More specifically, the invention relates to a driver circuit of an active matrix liquid crystal display device that employs a digital video signal as an image source and an active matrix liquid crystal display device using a driver circuit.

In recent years, display devices with a semiconductor thin film formed on an insulator such as a glass substrate have gained great popularity, especially, active matrix display devices using a thin film transistor (hereinafter referred to as TFT). Any of these active matrix display devices using a TFT has several hundred thousands to several million TFTs and controls electric charge of respective pixels to display an image.

A technique that is being developed lately relates to a polysilicon TFT for simultaneously forming a pixel TFT and a driver circuit TFT. The pixel TFT is a TFT constituting a pixel and the driver circuit TFT is a TFT constituting a driver circuit that is provided in the periphery of a pixel portion. The technique is a great contribution to reduction in size and reduction in power consumption of the display devices. Owing to the development of this technique, liquid crystal display devices are becoming indispensable devices for, e.g., display units of mobile machines, which lately find their application in increasingly larger fields.

FIG. 13 shows an example of a schematic diagram of a liquid crystal display device driven by a digital method. A pixel portion 1308 is placed in the center. Above the pixel portion, a source signal line driver circuit 1301 is arranged to control source signal lines. The source signal line driver circuit 1301 has first latch circuits 1304, second latch circuits 1305, D/A converter circuits 1306, analog switches 1307, etc. Gate signal line driver circuits 1302 for controlling gate signal lines are arranged to the left and right of the pixel portion. Although the gate signal line driver circuits 1302 are provided on both sides of the pixel portion in FIG. 13, only one gate signal line driver circuit may be provided to the left or right of the pixel portion. However, it is desirable to place the gate signal line driver circuit on each side of the pixel portion from the viewpoint of driving efficiency and driving reliability.

The source signal line driver circuit 1301 has a structure as the one shown in FIG. 14. The driver circuit shown in FIG. 14 as an example is a source signal line driver circuit with a horizontal resolution of 1024 pixels for 3 bit digital gray scale display. The driver circuit includes shift register circuits (SR) 1401, first latch circuits (LAT1) 1402, second latch circuits (LAT2) 1403, D/A converter circuits (or D/A converters: D/A) 1404, etc. Though not shown in FIG. 14, the driver circuit may have a buffer circuit, a level shifter circuit and the like if necessary.

Referring to FIGS. 13 and 14, the operation of the device will be explained briefly. First, clock signals (S-CLK, S-CLKb) and start pulses (S-SP) are inputted to shift register circuits 1303 (denoted by SR in FIG. 14) and pulses are outputted sequentially. The pulses are then inputted to the first latch circuits 1304 (denoted by LAT1 in FIG. 14) so that digital video signals (digital data) also inputted to the first latch circuits 1304 are held therein respectively. Here, D1 is the most significant bit (MSB) whereas D3 is the least significant bit (LSB). When the first latch circuits 1304 complete holding digital video signals corresponding to one horizontal period, the digital video signals held in the first latch circuits 1304 are transferred to the second latch circuits 1305 (denoted by LAT2 in FIG. 14) all at once in response to input of latch signals (latch pulses) during the retrace period.

Thereafter, the shift register circuits 1303 again operate to start holding of digital video signals corresponding to the next one horizontal period. At the same time, the digital video signals held in the second latch circuits 1305 are converted into analog video signals by the D/A converter circuits 1306 (denoted by D/A in FIG. 14). The analog video signals converted from the digital video signals are written in pixels through source signal lines. An image is displayed by repeating this operation.

In a general active matrix liquid crystal display device, screen display is updated about sixty times for every second in order to display animation smoothly. In other words, it is necessary to supply digital video signals for every new frame and the signals have to be written in pixels each time. Even when the image to be displayed is a still image; the same digital video signals have to be kept supplied for every new frame and a driver circuit has to process the same digital video signals repeatedly and continuously.

An alternative method is to write digital video signals of the still image in an external memory circuit once and then supply the digital video signals from the external memory circuit to the liquid crystal display device each time a new frame is started. However, the alternative method is no different from the above method in that the external memory circuit and the driver circuit of the display device are required continuing to operate.

Reduction in power consumption is greatly demanded particularly in mobile machines. Despite the fact that mobile machines are used mostly in a still image mode, external circuits and driver circuits of the mobile machines continue to operate even during still image display as described above. Therefore, reducing power consumption is hindered.

SUMMARY OF THE INVENTION

The present invention has been made in view of the above problems, and an object of the present invention is therefore to reduce power consumption in an external circuit, a signal line driver circuit, and the like while a still image is displayed by employing a novel circuit.

In order to attain the object above, the present invention uses the following measures.

A plurality of memory circuits are provided in each pixel so that digital video signals are stored for each pixel. In the case of displaying a still image, information to be written into a pixel is the same. Therefore, once signals are written, the still image can be continuously displayed by reading out the signals stored in the memory circuits instead of inputting the signals each time a new frame is started. This means that, when a still image is to be displayed, an external circuit, a source signal line driver circuit, and the like can stop their operation once they finish processing signals corresponding to at least one frame.

Furthermore, some of the memory circuits arranged in each pixel are non-volatile and digital video signals stored in the non-volatile memory circuits once can be kept stored after power supply to the display device is shut off. Accordingly, when the display device is turned on again, there is no need to newly sample the digital video signals but the digital signals are read out of the non-volatile memory circuits to display a still image. This can lead to great reduction in power consumption.

A liquid crystal display device according to a first aspect of the present invention is characterized in that:

the liquid crystal display device comprises: a plurality of pixels, wherein the plural pixels each comprises a plurality of memory circuits and a plurality of non-volatile memory circuits.

A liquid crystal display device according to a second aspect of the present invention is characterized in that:

the liquid crystal display device comprises: a plurality of pixels, wherein the plural pixels each comprises:

n×m memory circuits for storing m (m is a natural number and satisfies $1 \leq m$) frames of n (n is a natural number and satisfies $2 \leq n$) bit digital video signals; and n×k non-volatile memory circuits for storing k (k is a natural number and satisfies $1 \leq k$) of the n bit digital video signals.

A liquid crystal display device according to a third aspect of the present invention is characterized in that:

the liquid crystal display device comprises: a plurality of pixels, the plural pixels each comprising:

a source signal line;

n (n is a natural number and satisfies $2 \leq n$) writing gate signal lines;

n reading gate signal lines;

n writing transistors;

n reading transistors;

n×m memory circuits for storing m (m is a natural number and satisfies $1 \leq m$) frames of n bit digital video signals;

n×k non-volatile memory circuits for storing k (k is a natural number and satisfies $1 \leq k$) of the n bit digital video signals;

2n memory circuit selecting units;

2n non-volatile memory circuit selecting units; and a liquid crystal element, wherein each gate electrode of the n writing transistors is electrically connected to one of the n writing gate signal lines, with no two gate electrodes sharing the same writing gate signal line, wherein each input electrode of the n writing transistors is electrically connected to the source signal line, wherein each output electrode of the n writing transistors is electrically connected to one of m circuits out of the n×m memory circuits through one of n units out of the 2n memory circuit selecting units, each memory circuit selecting unit making selection for no more than one output electrode, wherein each output electrode of the n writing transistors is electrically connected to one of k circuits out of the n×k non-volatile memory circuits through one of n units out of the 2n non-volatile memory circuit selecting units, each non-volatile memory circuit selecting unit making selection for no more than one output electrode, wherein each gate electrode of the n reading transistors is electrically connected to one of the n reading gate signal lines, with no two gate electrodes sharing the same reading gate signal line, wherein each input electrode of the n reading transistors is electrically connected to one of m circuits out of the n×m memory circuits through one of n units out of the 2n memory circuit selecting units, each memory circuit selecting unit making selection for no more than one input electrode, wherein each input electrode of the n reading transistors is electrically connected to one of k circuits out of the n×k non-volatile memory circuits through one of n units of the 2n non-volatile memory circuit selecting units, each non-volatile memory circuit selecting unit making selection for no more than one input electrode, and wherein each output electrode of the n reading transistors is electrically connected to one of electrodes of the liquid crystal element.

A liquid crystal display device according to a fourth aspect of the present invention is characterized in that:

the liquid crystal display device comprises: a plurality of pixels, the plural pixels each comprising:

n (n is a natural number and satisfies $2 \leq n$) source signal lines;

a writing gate signal line;

n reading gate signal lines;

n writing transistors;

n reading transistors;

n×m memory circuits for storing m (m is a natural number and satisfies $1 \leq m$) frames of n bit digital video signals;

n×k non-volatile memory circuits for storing k (k is a natural number and satisfies $1 \leq k$) of the n bit digital video signals;

2n memory circuit selecting units;

2n non-volatile memory circuit selecting units; and a liquid crystal element, wherein each gate electrode of the n writing transistors is electrically connected to the writing gate signal line, wherein each input electrode of the n writing transistors is electrically connected to one of the n source signal lines, with no two input electrodes sharing the same source signal line, wherein each output electrode of the n writing transistors is electrically connected to one of m circuits out of the n×m memory circuits through one of n units out of the 2n memory circuit selecting units, each memory circuit selecting unit making selection for no more than one output electrode, wherein each output electrode of the n writing transistors is electrically connected to one of k circuits out of the n×k non-volatile memory circuits through one of n units out of the 2n non-volatile memory circuit selecting units, each non-volatile memory circuit selecting unit making selection for no more than one output electrode, wherein each gate electrode of the n reading transistors is electrically connected to one of the n reading gate signal lines, with no two gate electrodes sharing the same reading gate signal line, wherein each input electrode of the n reading transistors is electrically connected to one of m circuits out of the n×m memory circuits through one of n units out of the 2n memory circuit selecting units, each memory circuit selecting unit making selection for no more than one input electrode, wherein each input electrode of the n reading transistors is electrically connected to one of k circuits out of the n×k non-volatile memory circuits through one of n units out of the 2n non-volatile memory circuit selecting units, each non-volatile memory circuit selecting unit making selection for no more than one input electrode, and wherein each output electrode of the n reading transistors is electrically connected to one of electrodes of the liquid crystal element.

A liquid crystal display device according to a fifth aspect of the present invention is characterized in that:

wherein one of the m memory circuits is selected by one of the memory circuit selecting units, or one of the k non-volatile memory circuits is selected by one of the non-volatile memory circuit selecting unit, to communicate the selected memory circuit or non-volatile memory circuit with the output electrode of its associated writing transistor, thereby writing the digital video signals in the selected memory circuit, or wherein one of the m memory circuits is selected by one of the memory circuit selecting units, or one of the k non-volatile memory circuits is selected by one of the non-volatile memory circuit selecting unit, to communicate the selected memory circuit or non-volatile memory circuit with the input electrode of its associated reading transistor, thereby reading the digital video signals stored in the selected memory circuit.

A liquid crystal display device according to a sixth aspect of the present invention further to the third aspect is characterized in that:

the display device further comprising:

shift registers for outputting sampling pulses sequentially in response to clock signals and start pulses;

first latch circuits for holding n (n is a natural number and satisfies $2 \leq n$) bit digital video signals in response to the sampling pulses;

second latch circuits for receiving the n bit digital video signals that have been held in the first latch circuits; and bit selecting circuits for selecting the n bit digital video signals transferred to the second latch circuits one bit by one bit to output the signals to the source signal line.

A liquid crystal display device according to a seventh aspect of the present invention further to the fourth aspect is characterized in that:

the display device further comprising:

shift registers for outputting sampling pulses sequentially in response to clock signals and start pulses;

first latch circuits for holding 1 bit digital video signal out of n (n is a natural number and satisfies $2 \leq n$) bit digital video signals in response to the sampling pulses; and second latch circuits for receiving the 1 bit digital video signal that has been held in the first latch circuits to output the 1 bit digital video signal to the source signal lines.

A liquid crystal display device according to a eighth aspect of the present invention further to the fourth aspect is characterized in that:

the display device further comprising:

shift registers for outputting sampling pulses sequentially in response to clock signals and start pulses;

latch circuits for holding 1 bit digital video signal in response to the sampling pulses; and bit selecting circuits for selecting one of the source signal lines in order to output the 1 bit digital video signal that has been held in the latch circuits to the selected source signal line.

A liquid crystal display device according to a ninth aspect of the present invention is characterized in that the memory circuits are static random access memories (SRAM).

A liquid crystal display device according to a tenth aspect of the present intention is characterized in that the memory circuits are ferroelectric random access memories (FeRAM).

A liquid crystal display device according to a eleventh aspect of the present invention is characterized in that the memory circuits are dynamic random access memories (DRAM).

A liquid crystal display device according to a twelfth aspect of the present invention is characterized in that the non-volatile memory circuits are non-volatile electrically erasable programmable read only memories (EEPROM).

A liquid crystal display device according to a thirteenth aspect of the present invention is characterized in that the memory circuits are formed on a glass substrate.

A liquid crystal display device according to a fourteenth aspect of the present invention is characterized in that the memory circuits are formed on a plastic substrate.

A liquid crystal display device according to a fifteenth aspect of the present invention is characterized in that the memory circuits are formed on a stainless steel substrate.

A liquid crystal display device according to a sixteenth aspect of the present invention is characterized in that the memory circuits are formed on a single crystal wafer.

According to a seventeenth aspect of the present invention, a method of driving a liquid crystal display device using n (n is a natural number and satisfies $2 \leq n$) bit digital video signals to display an image, the liquid crystal display device including a source signal line driving circuit, a gate signal line driving circuit, and a plurality of pixels is characterized in that:

wherein shift registers in the source signal line driving circuit output sampling pulses, which are inputted to latch circuits, which hold the digital video signals in response to the sampling pulses, the held digital video signals being written in a source signal line, wherein gate signal line selecting pulses are outputted in the gate signal line driving circuit to select a gate signal line, and wherein one of the following (a) through (e) is conducted in pixels in the row of the selected gate signal line out of the plural pixels:

(a) the n bit digital video signals inputted from the source signal line are written in memory circuits;

(b) the n bit digital video signals stored in the memory circuits are read;

(c) the n bit digital video signals inputted from the source signal line or the n bit digital video signals stored in the memory circuits are written in non-volatile memory circuits;

(d) the n bit digital video signals stored in the non-volatile memory circuits are read; and (e) the n bit digital video signals stored in the non-volatile memory circuits are written in the memory circuits.

According to an eighteenth aspect of the present invention, a method of driving a liquid crystal display device using n (n is a natural number and satisfies $2 \leq n$) bit digital video signals to display an image, the liquid crystal display device including a source signal line driving circuit, a gate signal line driving circuit, and a plurality of pixels is characterized in that:

wherein shift registers in the source signal line driving circuit output sampling pulses, which are inputted to latch circuits, which hold the digital video signals in response to the sampling pulses, the held digital video signals being written in a source signal line, wherein gate signal line selecting pulses are outputted in the gate signal line driving circuit to select gate signal lines in order from the first row, and wherein the n bit digital video signals are written in or read out the plural pixels in order from the first row.

According to a nineteenth aspect of the present invention, a method of driving a liquid crystal display device using n (n is a natural number and satisfies $2 \leq n$) bit digital video signals to display an image, the liquid crystal display device including a source signal line driving circuit, a gate signal line driving circuit, and a plurality of pixels is characterized in that:

wherein shift registers in the source signal line driving circuit output sampling pulses, which are inputted to latch circuits, which hold the digital video signals in response to the sampling pulses, the held digital video signals being written in a source signal line, wherein the gate signal line driving circuit selects a gate signal line by outputting a gate signal line selecting pulse to an arbitrarily specified row of gate signal line, and wherein the n bit digital video signals are written in or read out pixels in the arbitrarily selected row of gate signal line out of the plural pixels.

According to a twentieth aspect of the present invention, wherein, during a still image display period, the n bit digital video signals stored in the memory circuits are repeatedly read to display a still image, so that the source signal line driving circuit can stop its operation.

According to a twenty-first aspect of the present invention, an electronic device comprising a liquid crystal display device according to any one of first through sixteenth aspects.

According to a twenty-second aspect of the present invention, an electronic device employing a method of driving a liquid crystal display device according to any one of seventeenth through twentieth aspects.

According to a twenty-third aspect of the present invention, an electronic device according to twenty-first or twenty-second aspect, wherein the electronic device is one of a television set, a personal computer, a portable terminal, a video camera, and a head mounted display.

BRIEF DESCRIPTION OF THE DRAWINGS

In the accompanying drawings:

FIGS. 3A to 3C are timing charts for displaying an image using a pixel of the present invention;

FIGS. 7A to 7C are timing charts for displaying an image using the circuits shown in FIGS. 5 and 6;

FIGS. 16A to 16D are diagrams showing examples of an electronic device to which a display device having a pixel of the present invention can be applied;

FIGS. 19A and 19B are diagrams showing an example of manufacturing a liquid crystal display device having a pixel of the present invention;

DETAILED DESCRIPTION OF THE PREFERRED EMBODIMENTS

Embodiment Mode

Figure 2:
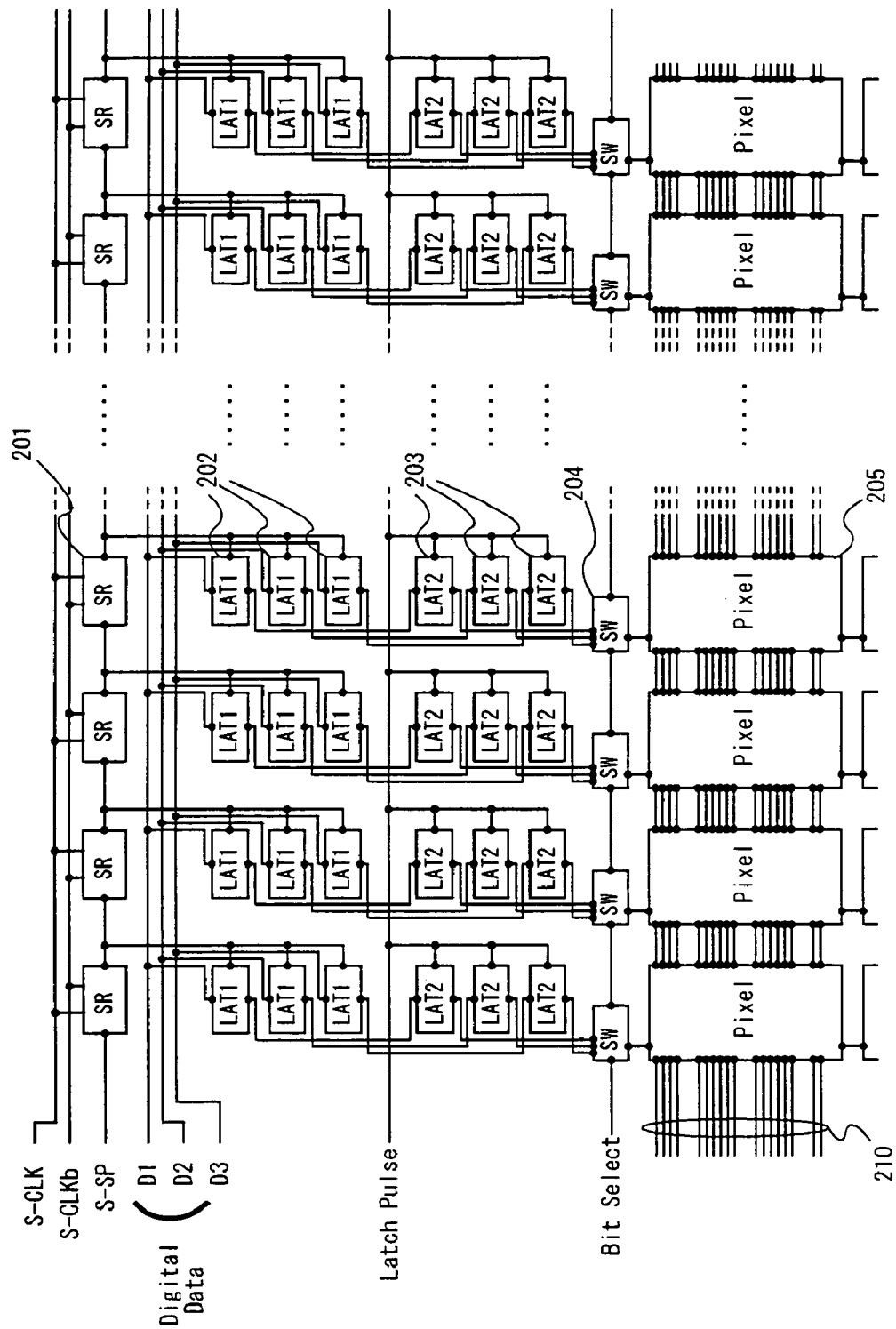
FIG. 2 is a diagram showing an example of the circuit structure of a source signal line driver circuit for displaying an image using a pixel of the present invention.

FIG. 2 shows the structure of a source signal line driver circuit and the structure of some of pixels in a liquid crystal display device that employs pixels having memory circuits. The circuit is capable of handling 3 bit digital gray scale signals, and is composed of shift register circuits 201, first latch circuits 202, second latch circuits 203, bit signal selecting switches 204, and pixels 205. Denoted by 210 are signal lines to which signals are inputted from a gate signal line driver circuit, or directly from the external, and descriptions of the signal lines will be found later along with explanations of the pixels.

Figure 1:
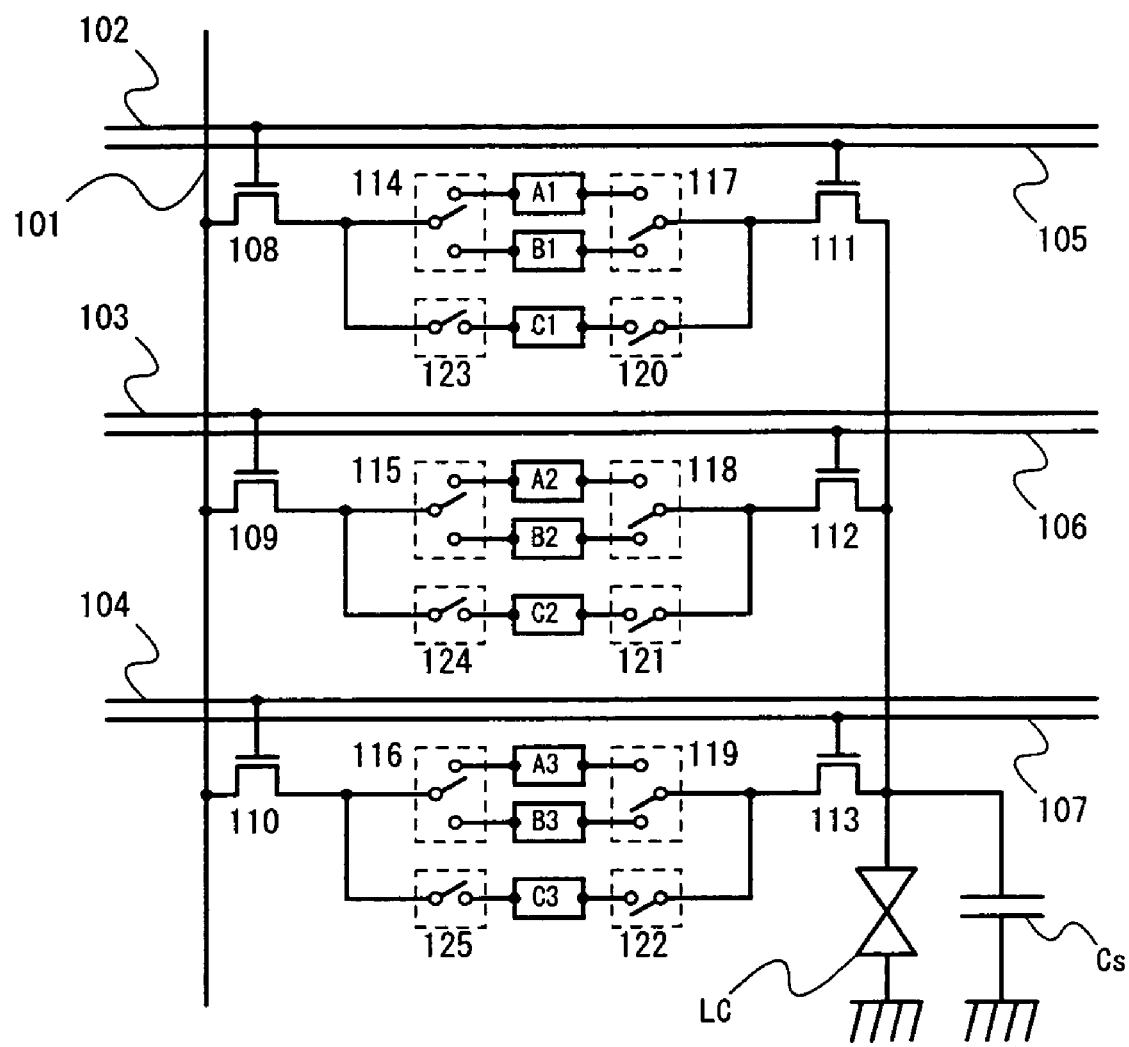
FIG. 1 is a circuit diagram of a pixel according to the present invention, the pixel having therein a plurality of memory circuits and a plurality of non-volatile memory circuits.

FIG. 1 shows a detailed circuit structure of one of the pixels 205 in FIG. 2. The pixel is for 3 bit digital gray scale, and is composed of a liquid crystal element (LC), a capacitor storage (Cs), volatile memory circuits (A1 to A3 and B1 to B3), non-volatile memory circuits (C1 to C3), etc. Denoted by 101 is a source signal line. 102 to 104 represent writing gate signal lines, 105 to 107, reading gate signal lines, 108 to 110, writing TFTs, 111 to 113, reading TFTs, and 114 to 125, memory circuit selecting 110 units.

The present invention is characterized in that the memory circuits in each pixel include non-volatile memory circuits (denoted by C1 to C3 in FIG. 1) for storing at least one frame of n bit digital video signals. The rest of the memory circuits here are referred to as volatile memory circuits on purpose to distinguish them from the non-volatile memory circuits. However, the memory circuits A1 to A3 and B1 to B 3 may not always be volatile memory circuits but may be non-volatile ones. The memory circuits A1 to A3 and B1 to B3 in this embodiment mode are volatile memory circuits such as SRAM and DRAM because both writing and reading have to be done in one frame period and the writing time and the reading time need to be short enough.

FIGS. 3A to 3C show simplified operation timing in the display device shown in FIG. 1 in accordance with the present invention. The display device is for 3 bit digital gray scales and has a VGA level resolution. A method of driving this display device will be described with reference to FIGS. 1 to 3C. The reference symbols used in this description are the same as those in FIGS. 1 to 3C.

Reference is made to FIG. 2 and FIGS. 3A and 3B. In FIG. 3A, frame periods are respectively denoted by $\alpha$, $\beta$, $\gamma$, and $\delta$. The operation of the circuit in the frame period $\alpha$ is described first.

Similar to the conventional driver circuit of digital driving method, clock signals (S-CLK, S-CLKb) and start pulses (S-SP) are inputted to the shift register circuits 201 and sampling pulses are outputted sequentially. The sampling pulses are then inputted to the first latch circuits 202 (LAT1) so that digital video signals (digital data) also inputted to the first latch circuits 202 are held therein respectively. This period is referred to as dot data sampling period in this specification. The dot data sampling period for data corresponding to one horizontal period stretches from a period 1 to a period 480 in FIG. 3A. The digital video signals are 3 bit signals, and D1 is the most significant bit (MSB) whereas D3 is the least significant bit (LSB). When the first latch circuits 202 complete holding digital video signals corresponding to one horizontal period, the digital video signals held in the first latch circuits 202 are transferred to the second latch circuits 203 (LAT2) all at once in response to input of latch signals (latch pulses) during the retrace period.

Subsequently, the first latch circuits operate to hold digital video signals corresponding to the next horizontal period in response to sampling pulses again outputted from the shift register circuits 201.

On the other hand, the digital video signals transferred to the second latch circuits 203 are written in the volatile memory circuits arranged in each pixel. As shown in FIG. 3B, the dot data sampling period of the next column is divided into three, namely, a period I, a period II, and a period III, to output the digital video signals held in the second latch circuits to the source signal line. At this point, the bit signal selecting switches 204 make selective connection to output the signals of the respective bits to the source signal line in order.

In the period I, pulses are inputted to the writing gate signal line 102 to turn the TFT 108 conductive and the memory circuit selecting unit 114 selects the volatile memory circuit A1 so that digital video signals are written in the volatile memory circuit A1. Subsequently, in the period II, pulses are inputted to the writing gate signal line 103 to turn the TFT 109 conductive and the memory circuit selecting unit 115 selects the volatile memory circuit A2 so that digital video signals are written in the volatile memory circuit A2. Lastly, in the period III, pulses are inputted to the writing gate signal line 104 to turn the TFT 110 conductive and the memory circuit selecting unit 116 selects the volatile memory circuit A3 so that digital video signals are written in the volatile memory circuit A3.

The above steps complete processing of digital video signals corresponding to one horizontal period. The periods in FIG. 3B correspond to the period indicated by * in FIG. 3A. The above operation is repeated until the last stage is processed, thereby completing writing digital video signals of one frame in the volatile memory circuits A1 to A3.

In the display device of the present invention, 3 bit digital gray scales are obtained through a time gray scale method. Unlike the usual gray scale method in which the luminance is controlled by the level of voltage applied to pixels, the time gray scale method applies only two levels of voltage to pixels to render the pixels to an ON state and an OFF state (the ON state corresponds to white and the OFF state corresponds to black on the screen) and gray scales are created utilizing difference in display time. When n bit gray scale display is to be obtained by the time gray scale method, the display period is divided into n periods and the ratio of the periods is set in accordance with power of 2, as in $2^{n-1}:2^{n-2}:\ldots:2^0$. The length of the display period of a pixel is varied depending on in which period the pixel is brought into an ON state, whereby gray scale display is attained. A pixel being in an ON state here means that a voltage is applied between pixel electrodes whereas a pixel being in an OFF state means that a voltage is not applied to the pixel.

If the display period is divided into periods in accordance with other rules than power of 2, it is still possible to obtain gray scale display.

Based on the above description, the operation of the circuit in the frame period $\beta$ will be explained. When writing in the volatile memory circuits in the last stage is finished, the first frame is displayed. FIG. 3C is a diagram illustrating a 3 bit time gray scale method. Currently, digital video signals are assorted by their bits into three groups and the groups are respectively stored in the volatile memory circuits A1 to A3. Ts1 denotes a period of display by first bit data, Ts2 denotes a period of display by second bit data, and Ts3 denotes a period of display by third bit data. The lengths of these display periods are set to satisfy Ts1:Ts2:Ts3=4:2:1.

Since the signals here are 3 bit signals, the luminance obtained ranges from 0 to 7, namely, 8 levels in total. When a pixel is not brought into an ON state in any of the periods Ts1 to Ts3, the luminance is 0. When a pixel is in an ON state throughout the entire periods, the luminance is 7. If a pixel is to have the fifth level of luminance, the pixel is brought into ON state in Ts1 and Ts3.

Specific explanations will be given referring to the drawings. In the period Ts1, pulses are inputted to the reading gate signal line 105 to turn the TFT 111 conductive and the memory circuit selecting unit 117 selects the volatile memory circuit A1 so that the pixel is driven in accordance with the digital video signals stored in the volatile memory circuit A1. Subsequently, in Ts2, pulses are inputted to the reading gate signal line 106 to turn the TFT 112 conductive and the memory circuit selecting unit 118 selects the volatile memory circuit A2 so that the pixel is driven in accordance with the digital video signals stored in the volatile memory circuit A2. Lastly, in Ts3, pulses are inputted to the reading gate signal line 107 to turn the TFT 113 conductive and the memory circuit selecting unit 119 selects the volatile memory circuit A3 so that a voltage is applied to the pixel in accordance with the digital video signals stored in the volatile memory circuit A3.

When the display device is a liquid crystal display device, there are a normally white mode and a normally black mode. In both modes, white and black are inverted when a pixel switches between an ON state and an OFF state. Accordingly, the luminance may be reverse to what is described in the above.

Data corresponding to one frame period are displayed as above. Meanwhile, the driver circuit is processing digital video signals of the next frame period. The procedure is the same as the one described above up through transferring the digital video signals to the second latch circuits. In the subsequent volatile memory circuit writing period, the other volatile memory circuits are used. However, if the number of volatile memory circuits in the pixel is not large enough for more than one frame, data of the next frame are overwritten in the volatile memory circuits in which data of the previous frame have already been written.

In the period I, pulses are inputted to the writing gate signal line 102 to turn the TFT 108 conductive and the memory circuit selecting unit 114 selects the volatile memory circuit B1 so that digital video signals are written in the volatile memory circuit B1. Subsequently, in the period II, pulses are inputted to the writing gate signal line 103 to turn the TFT 109 conductive and the memory circuit selecting unit 115 selects the volatile memory circuit B2 so that digital video signals are written in the volatile memory circuit B2. Lastly, in the period III, pulses are inputted to the writing gate signal line 104 to turn the TFT 110 conductive and the memory circuit selecting unit 116 selects the volatile memory circuit B3 so that digital video signals are written in the volatile memory circuit B3.

Then the frame period γ is started and the second frame is displayed in accordance with the digital video signals stored in the volatile memory circuits B1 to B3. At the same time, processing of digital video signals of the next frame period is commenced. The digital video signals of the next frame period are stored again in the volatile memory circuits A1 to A3 that have finished their operations related to display of the first frame period.

Thereafter, the digital video signals stored in the volatile memory circuits A1 to A3 are displayed in the frame period δ, and digital video signals of the next frame period simultaneously begin to receive processing. The digital video signals of the next frame period are stored again in the volatile memory circuits B1 to B3 that have finished their operations related to display of the second frame period.

Writing digital video signals in the non-volatile memory circuits C1 to C3 usually takes much longer time than writing digital video signals in volatile memory circuits such as SRAM. Therefore, desirable procedure is to store digital video signals in the volatile memory circuits A1 to A3 or B1 to B3 and then write the stored signals in the non-volatile memory circuits C1 to C3. In FIG. 1, writing in the volatile memory circuits A1 to A3 or B1 to B3 is completed before the reading TFTs 111 to 113 are turned ON to display an image. When data is to be written in the non-volatile memory circuits, the reading TFTs 111 to 113 are turned OFF and the memory circuit selecting units 120–122 respectively select the non-volatile memory circuits C1 to C3. No image is displayed on the screen in this writing period but the writing time is about several ms to 100 ms, hardly causing a problem.

Upon turning the display device on, an image is displayed by reading the digital video signals stored in the non-volatile memory circuits C1 to C3. In this case also, it is desirable to write data in the volatile memory circuits A1 to A3 or B1 to B3 once and read the stored data from the volatile memory circuits A1 to A3 or B1 to B3 in the subsequent frame periods.

The above operations are repeated to display an image continuously. If the image to be displayed is a still image, digital video signals are stored in the volatile memory circuits A1 to A3 in the first operation. Once the digital video signals are stored, the digital video signals stored in the volatile memory circuits A1 to A3 are repeatedly read out for every new frame period. Thus driving of an external circuit, the source signal line driver circuit, and the like can be stopped while the still image is displayed.

Furthermore, digital video signals can be kept stored after power supply to the liquid crystal display device is shut off by writing digital video signals in the non-volatile memory circuits C1 to C3 provided in the pixel. Accordingly, when the display device is turned on again, a still image can be displayed without newly sampling the digital video signals.

Figure 20:
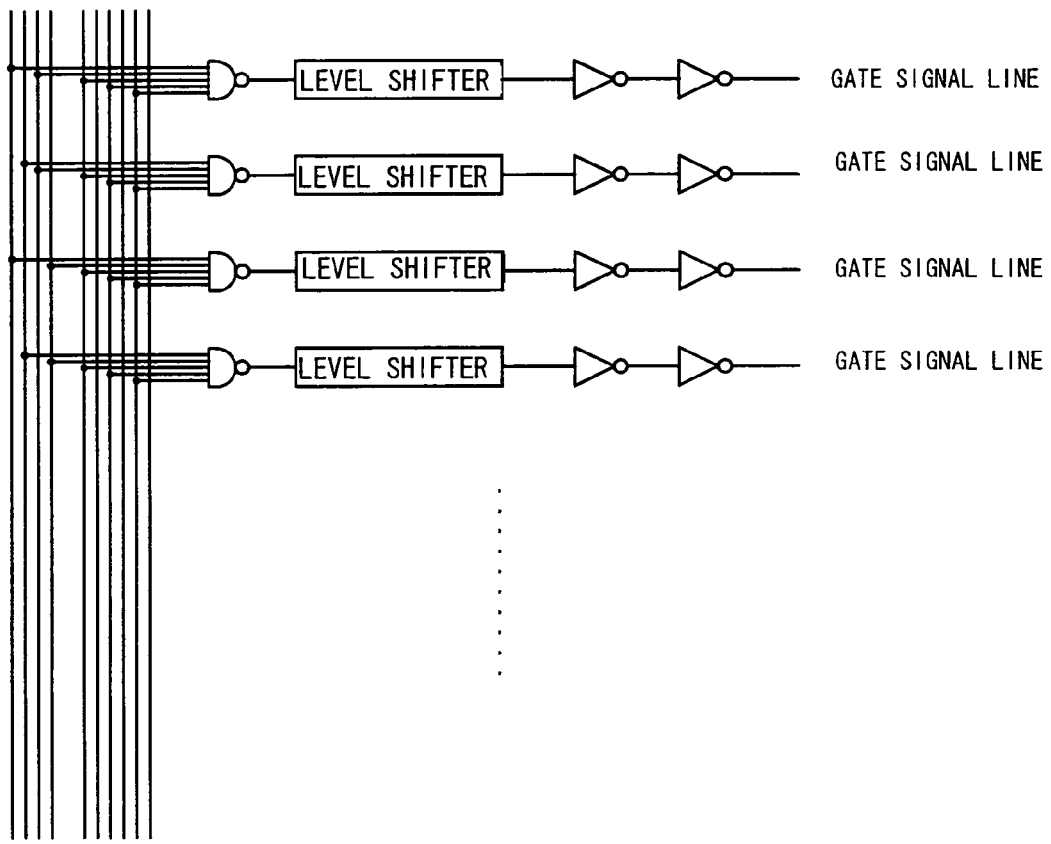
FIG. 20 is a diagram showing an example of a gate signal line driver circuit using a decoder.

Moreover, the gate signal lines can be used one by one, as opposed to driving all of them at once, in writing digital video signals in the memory circuits or reading digital video signals out of the memory circuits. In other words, partial rewriting of a screen is possible by operating the source signal line driver circuit and the gate signal line driver circuit for only a short period of time, thereby increasing display manner options. In this case, it is desirable to use a decoder as the gate signal line driver circuit. A decoder appropriate to use is a circuit disclosed in Japanese Patent Application Laid-open No. Hei 8-101609. An example of the decoder is shown in FIG. 20. The source signal line driver circuit may also include a decoder to rewrite a part of a screen.

In this embodiment mode, one pixel has volatile memory circuits A1 to A3 and B1 to B3 in order to store 3 bit digital video signals corresponding to two frames. However, the number of memory circuits according to the present invention is not limited thereto. For example, when n bit digital video signals corresponding to m frames are to be stored, one pixel has n×m volatile memory circuits.

Similarly, the number of non-volatile memory circuits according to the present invention is not limited by this embodiment mode in which the non-volatile memory circuits C1 to C3 are provided in one pixel in order to store 3 bit digital video signals of one frame. If n bit digital video signals of k frames are to be kept stored after power supply is shut off, n×k non-volatile memory circuits are placed in each pixel.

The memory circuits provided in the pixels store digital video signals in the manner described above, so that the digital video signals stored in the memory circuits can be used repeatedly for every new frame period when a still image is displayed. This makes it possible to continuously display a still image without driving an external circuit, the source signal line driver circuit, and other circuits. Accordingly, the invention greatly contributes to reduction of power consumption in liquid crystal display devices.

The source signal line driver circuit may not necessarily be formed on an insulator integrally, considering arrangement of the latch circuits that increase in number in accordance with the bit number. A part of, or the entirety of, the source signal line driver circuit may be external to the insulator.

Although the source signal line driver circuit in this embodiment mode is provided with a number of latch circuits in accordance with the bit number, the source signal line driver circuit can operate also when the latch circuits are provided in a number necessary for only one bit data processing. In this case, digital video signals of from significant bit to less significant bit are inputted to the latch circuits in series.

Embodiments of the present invention will be described below.

Embodiment 1

This embodiment gives descriptions on the memory circuit selecting units in the circuit shown in Embodiment Mode, regarding its specific structure (arrangement of transistors and other components) and its operation.

Figure 4:
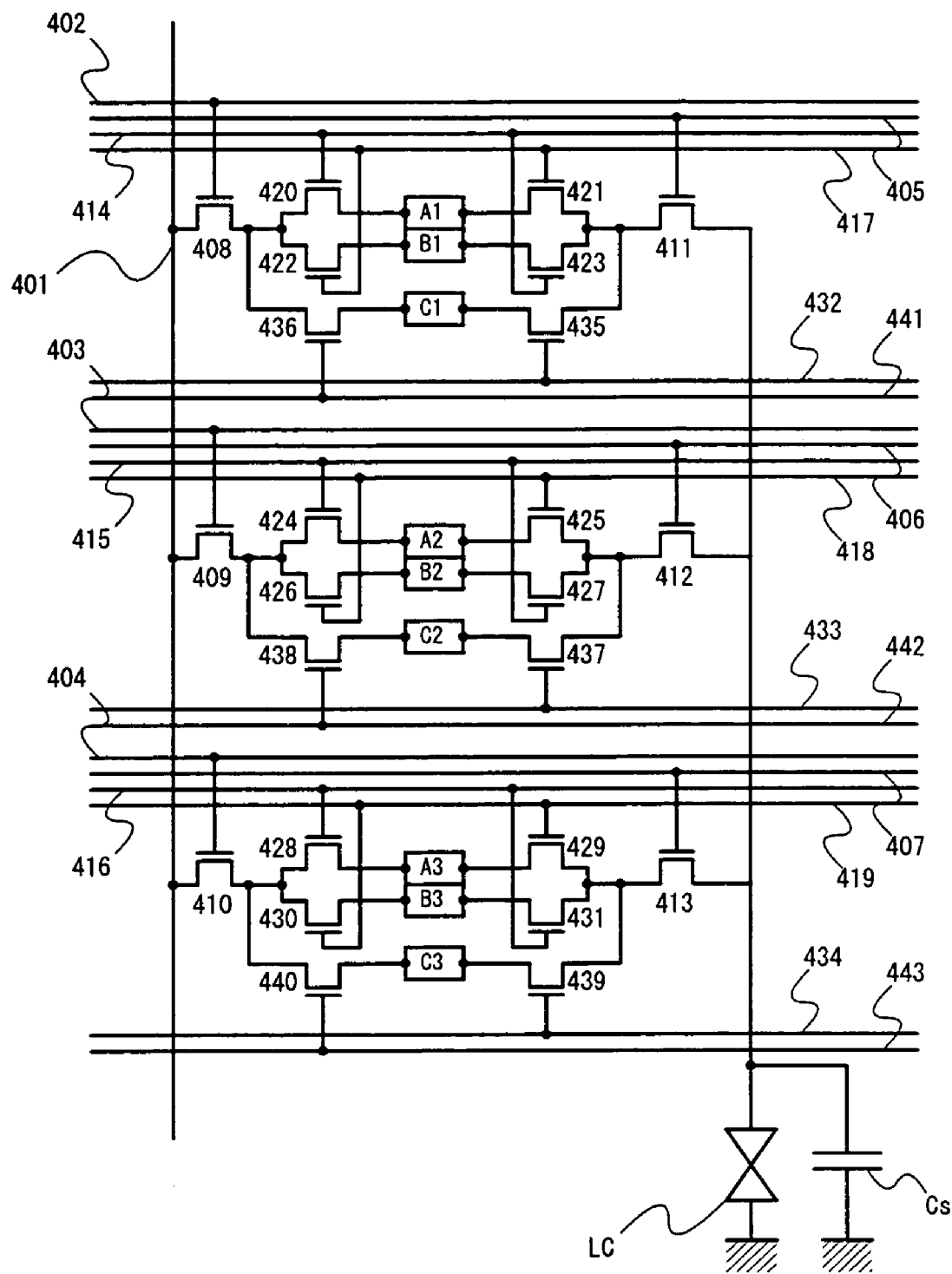
FIG. 4 is a detailed circuit diagram of a pixel according to the present invention, the pixel having therein a plurality of memory circuits and a plurality of non-volatile memory circuits.

FIG. 4 shows a pixel similar to the one shown in FIG. 1, but circuits constituting the memory circuit selecting units and the peripheral circuits thereof are shown here. In FIG. 4, volatile memory circuits A1 to A3 and B1 to B3 are respectively connected to writing selecting TFTs 420, 422, 424, 426, 428, and 430, and to reading selecting TFTs 421, 423, 425, 427, 429, and 431. The volatile memory circuits are respectively controlled by memory circuit selecting signal lines 414 to 419. Non-volatile memory circuits C1 to C3 are connected to writing selecting TFTs 435, 437, and 439, respectively, and are connected to reading selecting TFTs 436, 438, and 440, respectively. The non-volatile memory circuits are respectively controlled by memory circuit selecting signal lines 432 to 434 and 441 to 443. The pixel shown in this embodiment stores 3 bit digital video signals corresponding to two frames in the volatile memory circuits A1 to A3 and B1 to B3, and stores 3 bit digital video signals corresponding to one frame in the non-volatile memory circuits C1 to C3.

The circuit of this embodiment, shown in FIG. 4, may be driven in accordance with the timing charts described in Embodiment Mode with reference to FIGS. 3A to 3C. The operation of the circuit, plus a method of actually driving the memory circuit selecting units, will be described referring to FIGS. 3A to 3C and FIG. 4. The description adopts the reference symbols used in FIGS. 3A to 3C and FIG. 4.

Reference is made to FIGS. 3A and 3B. In FIG. 3A, frame periods are respectively denoted by α, β, γ, and δ. The operation of the circuit in the frame period a is described first.

Shift register circuits, first latch circuits, and second latch circuits are driven the same way as Embodiment Mode, so see the descriptions of Embodiment Mode.

First, pulses are inputted to the memory circuit selecting signal lines 414 to 416 to turn the writing selecting TFTs 420, 424, and 428 ON, thereby readying the volatile memory circuits A1 to A3 for writing in. In the period I, pulses are inputted to a writing gate signal line 402 to turn a writing TFT 408 conductive and digital video signals are written in the volatile memory circuit A1. Subsequently, in the period II, pulses are inputted to a writing gate signal line 403 to turn a writing TFT 409 conductive and digital video signals are written in the volatile memory circuit A2. Lastly, in the period III, pulses are inputted to a writing gate signal line 404 to turn a writing TFT 410 conductive and digital video signals are written in the volatile memory circuit A3.

The above steps complete processing of digital video signals corresponding to one horizontal period. The periods in FIG. 3B correspond to the period indicated by * in FIG. 3A. The above operation is repeated until the last stage is processed, thereby completing writing digital video signals of one frame in the volatile memory circuits A1 to A3.

Subsequently, the operation of the circuit in the frame period β will be explained. When writing in the volatile memory circuits in the last stage is finished, the first frame is displayed. FIG. 3C is a diagram illustrating a 3 bit time gray scale method. Currently, digital video signals are assorted by their bits into three groups and the groups are respectively stored in the volatile memory circuits A1 to A3. Ts1 denotes a period of display by first bit data, Ts2 denotes a period of display by second bit data, and Ts3 denotes a period of display by third bit data. The lengths of these display periods are set to satisfy Ts1:Ts2:Ts3=4:2:1.

If the display period is divided into periods in accordance with other rules than power of 2, it is still possible to obtain gray scale display.

Since the signals here are 3 bit signals, the luminance obtained ranges from 0 to 7, namely, 8 levels in total. When a pixel is not brought into an ON state in any of the periods Ts1 to Ts3, the luminance is 0. When a pixel is in an ON state throughout the entire periods, the luminance is 7. If a pixel is to have the fifth level of luminance, the pixel is brought into ON state in Ts1 and Ts3.

Specific explanations will be given referring to the drawings. When moving on to the display period after the operation of writing data in the volatile memory circuits is finished, supply of pulses to the memory circuit selecting signal lines 414 to 416 are cut to turn the writing selecting TFTs 420, 424, and 428 unconductive. At the same time, pulses are inputted to the memory circuit selecting signal lines 417 to 419 to turn the reading selecting TFTs 421, 425, and 429 conductive, thereby readying the volatile memory circuits A1 to A3 for reading. In the period Ts1, pulses are inputted to a reading gate signal line 405 to turn a reading TFT 411 conductive so that the pixel is driven in accordance with the digital video signals stored in the volatile memory circuit A1. Subsequently, in Ts2, pulses are inputted to a reading gate signal line 406 to turn a reading TFT 412 conductive so that the pixel is driven in accordance with the digital video signals stored in the volatile memory circuit A2. Lastly, in Ts3, pulses are inputted to a reading gate signal line 407 to turn a reading TFT 413 conductive so that a voltage is applied to the pixel in accordance with the digital video signals stored in the volatile memory circuit A3.

Data corresponding to one frame period are displayed as above. Meanwhile, the driver circuit is processing digital video signals of the next frame period. The procedure is the same as the one described above up through transferring the digital video signals to the second latch circuits. In the subsequent memory circuit writing period, the volatile memory circuits B1 to B3 are used.

During the period in which signals are written in the volatile memory circuits A1 to A3, the writing selecting TFTs 420, 424, and 428 are turned conductive to make the volatile memory circuits A1 to A3 writeable and, at the same time. the reading selecting TFTs 423, 427, and 431 are turned conductive to make the volatile memory circuits B1 to B3 readable. On the other hand, during the period in which signals are written in the volatile memory circuits B1 to B3, the writing selecting TFTs 422, 426, and 430 are turned conductive to make the volatile memory circuits B1 to B3 writeable and, at the same time, the reading selecting TFTs 421, 425, and 429 are turned conductive to make the volatile memory circuits A1 to A3 readable. To summarize, the volatile memory circuits A1 to A3 and B1 to B3 in the pixel of this embodiment alternately switches between writing and reading over every new frame period.

In the period I, pulses are inputted to the writing gate signal line 402 to turn the writing TFT 408 conductive so that digital video signals are written in the volatile memory circuit B1. Subsequently, in the period II, pulses are inputted to the writing gate signal line 403 to turn the writing TFT 409 conductive so that digital video signals are written in the volatile memory circuit B2. Lastly, in the period III, pulses are inputted to the writing gate signal line 404 to turn the writing TFT 410 conductive so that digital video signals are written in the volatile memory circuit B3.

Then the frame period γ is started and the second frame is displayed in accordance with the digital video signals stored in the volatile memory circuits B1 to B3. At the same time, processing of digital video signals of the next frame period is commenced. The digital video signals of the next frame period are stored again in the volatile memory circuits A1 to A3 that have finished their operations related to display of the first frame period.

Thereafter, the digital video signals stored in the volatile memory circuits A1 to A3 are displayed in the frame period δ, and digital video signals of the next frame period simultaneously begin to receive processing. The digital video signals of the next frame period are stored again in the volatile memory circuits B1 to B3 that have finished their operations related to display of the second frame period.

The operation of writing digital video signals in the non-volatile memory circuits C1 to C3 and the operation of reading digital video signals out of the non-volatile memory circuits C1 to C3 are the same as Embodiment Mode.

The procedure above is repeated to display an image. When the image to be displayed is a still image, the source signal line driver circuit stops its operation after digital video signals of some frame are written in the memory circuits, and the image is displayed by reading the same signals stored in the memory circuits each time a new frame is started. In this way, power consumption during still image display can be reduced greatly. Moreover, by storing the digital video signals using the non-volatile memory circuits, the digital video signals of the still image are kept stored after power supply to the display device is shut off and hence the still image can be displayed next time the display device is turned on.

Embodiment 2

This embodiment gives a description on a case where signals are written in volatile memory circuits of a pixel portion by dot-sequential system to eliminate the need for a second latch circuit of a source signal line driver circuit.

Figure 5:
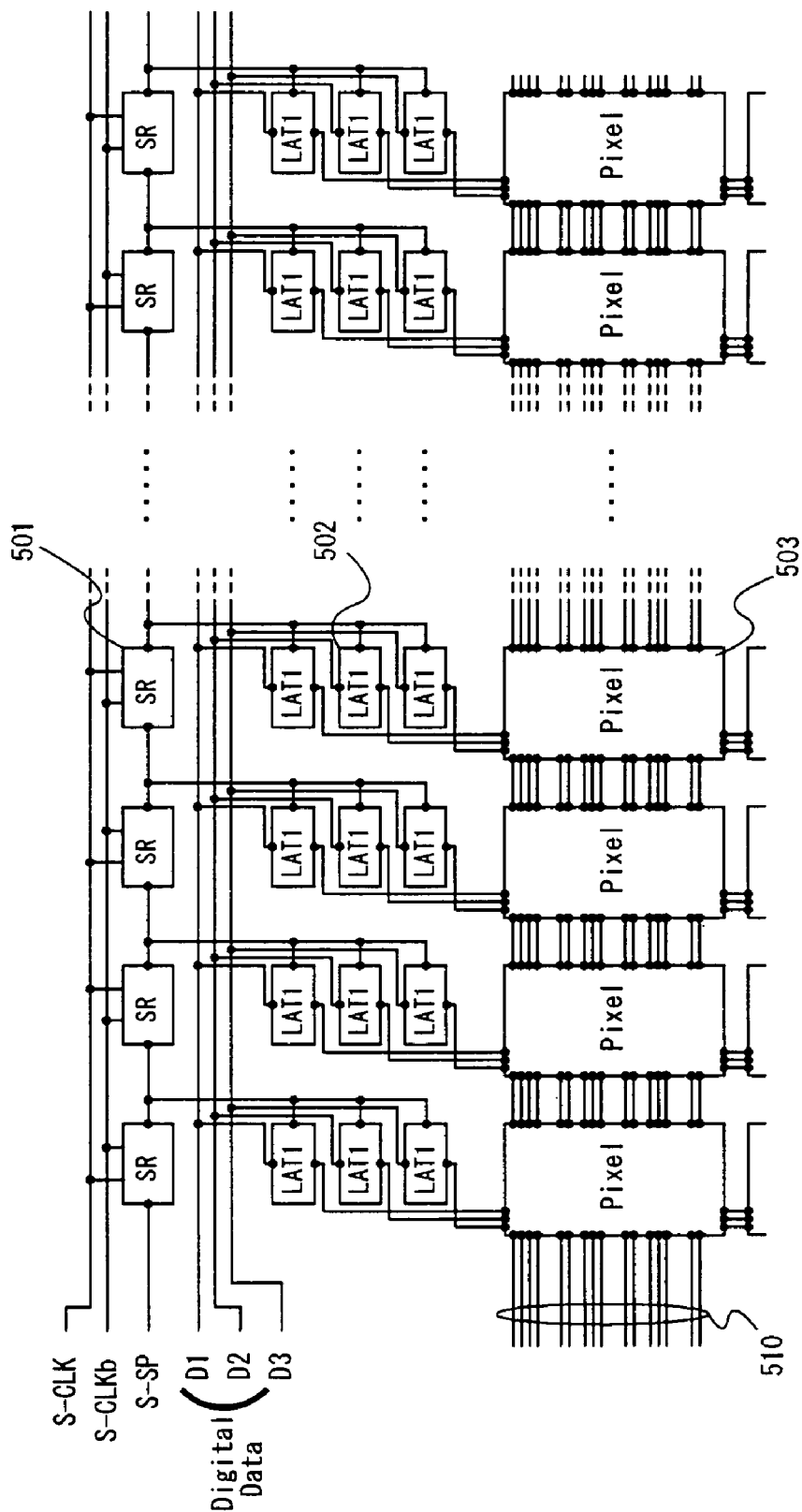
FIG. 5 is a diagram showing an example of the circuit structure of a source signal line driver circuit having no second latch circuit.

FIG. 5 shows the structure of a source signal line driver circuit and the structure of some of pixels in a liquid crystal display device that employs pixels having memory circuits. The circuit is capable of handling 3 bit digital video signals, and is composed of shift register circuits 501, latch circuits 502, and pixels 503. Denoted by 510 are signal lines to which signals are inputted from a gate signal line driver circuit or directly from the external, and descriptions of the signal lines will be found later along with explanations of the pixels.

Figure 6:
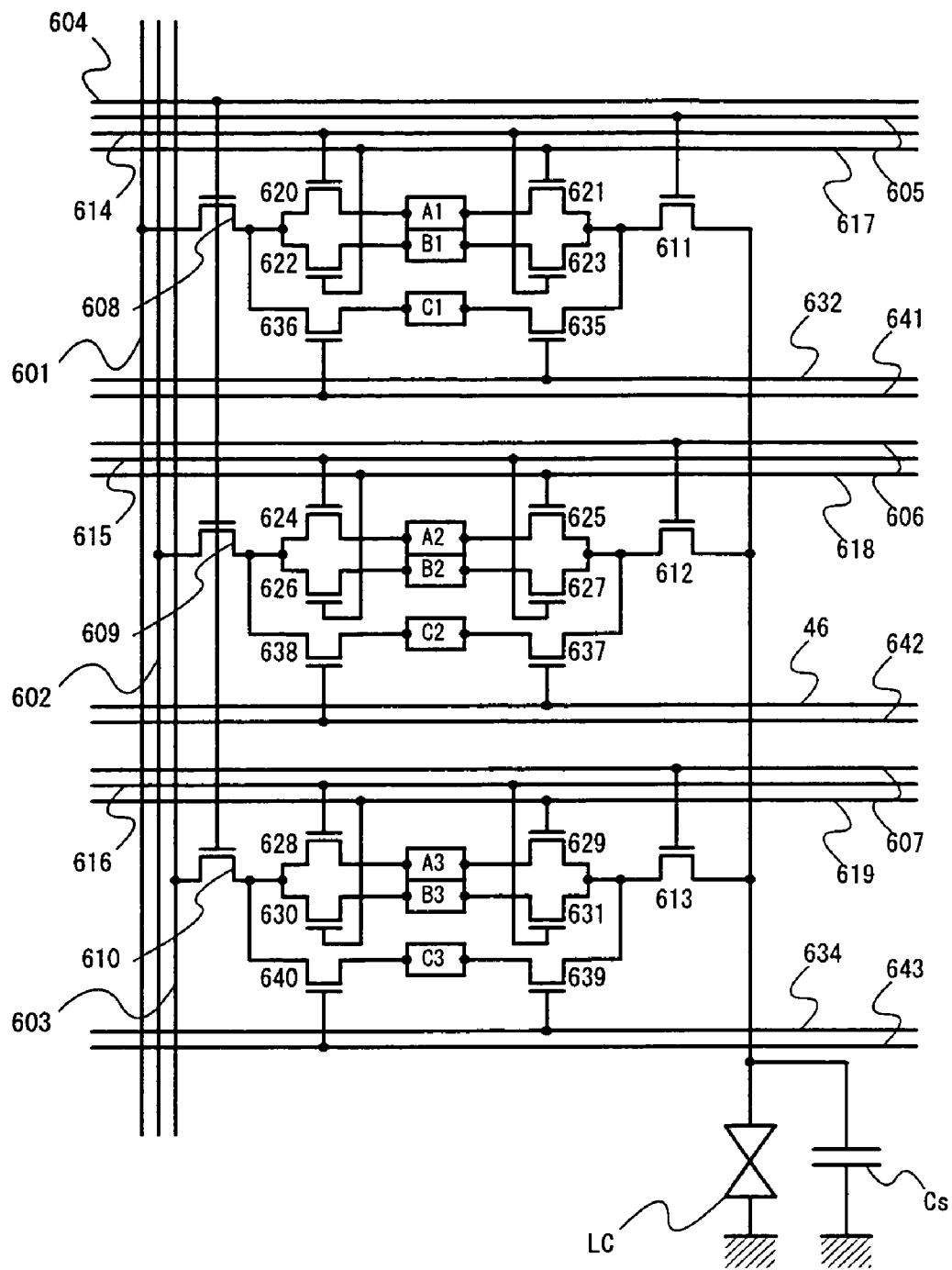
FIG. 6 is a detailed circuit diagram of a pixel to which the present invention is applied, the pixel being driven by the source signal line driver circuit of FIG. 5.

FIG. 6 shows a detailed circuit structure of one of the pixels 503 in FIG. 5. As in Embodiment 1, the pixel is for 3 bit digital gray scales, and is composed of a liquid crystal element (LC), volatile memory circuits (A1 to A3 and B1 to B3), non-volatile memory circuits (C1 to C3), etc. Denoted by 601 is a first bit (MSB) signal source signal line, 602, a second bit signal source signal line, and 603, a third bit (LSB) signal source signal line. Reference symbol 604 represents a writing gate signal line, 605 to 607, reading gate signal lines, 608 to 610, writing TFTs, and 611 to 613, reading TFTs. Memory circuit selecting units include writing selecting TFTs 620, 622, 624, 626, 628, and 630, reading selecting TFTs 621, 623, 625, 627, 629, and 631. and other circuits. 632 to 634 and 641 to 643 denote memory circuit selecting signal lines. Memory circuit selecting units for the non-volatile memory circuits C1 to C3 include writing selecting TFTs 636, 638, and 640, reading selecting TFTs 635, 637, and 639, and other circuits.

FIGS. 7A to 7C are timing charts regarding driving of the circuit of this embodiment. The description will be given with reference to FIG. 5, FIG. 6, and FIGS. 7A to 7C.

The operation of the shift register circuits 501 and the latch circuits (LAT1) 502 is the same as Embodiment Mode and Embodiment 1. As shown in FIG. 7B, writing in the volatile memory circuits in the pixel is started immediately after the latch operation for the first stage is finished. Pulses are inputted to the writing gate signal line 604 to turn the writing TFTs 608 to 610 conductive and the memory circuit selecting signal lines 614 to 616 also receive pulses to turn the writing selecting TFTs 620, 624, 628 conductive. The volatile memory circuits A1 to A3 are thus readied for writing. The digital video signals grouped by their bits and held in the latch circuits 502 in groups are simultaneously written in the volatile memory circuits through the three source signal lines 601 to 603.

While the digital video signals held in the latch circuits are written in the volatile memory circuits in the first stage, sampling pulses are newly outputted and, in response, digital video signals for the next stage are held in the latch circuits. Signals are thus sequentially written in the volatile memory circuits.

The operation above is conducted in one horizontal period (corresponding to the period indicated by ** in FIG. 7A) and the same operation is repeated for all the columns to complete writing digital video signals of one frame in the volatile memory circuits in the frame period a. Then a display period for the first frame, namely, the frame period β, is started. Supply of pulses to the writing gate signal line 604 is cut and supply of pulses to the memory circuit selecting signal lines 614 to 616 is also stopped to turn the writing selecting TFTs 620, 624, and 628 unconductive. Instead, pulses are inputted to the memory circuit selecting signal lines 617 to 619 to turn the reading selecting TFTs 621, 625, and 629 conductive, thereby readying the volatile memory circuits A1 to A3 for reading.

The time gray scale method described in Embodiment 1 is then applied as shown in FIG. 7C. In the display period Ts1, pulses are inputted to a reading gate signal line 605 to turn a reading TFT 611 conductive so that the digital video signals stored in the volatile memory circuit A1 are read out for display. Subsequently, in Ts2, pulses are inputted to a reading gate signal line 606 to turn a reading TFT 612 conductive so that the digital video signals stored in the volatile memory circuit A2 are read out for display. Similarly, in Ts3, pulses are inputted to a reading gate signal line 607 to turn a reading TFT 613 conductive so that the digital video signals stored in the volatile memory circuit A3 are read out for display.

Thus a display period for the first frame is completed. In the frame period β, digital video signals of the next frame are beginning to be processed at the same time. The procedure is the same as the one described above up through holding the digital video signals in the latch circuits 502. In the subsequent volatile memory circuit writing period, the volatile memory circuits B1 to B3 are used.

During the period in which signals are written in the volatile memory circuits A1 to A3, the writing selecting TFTs 620, 624, and 628 are turned conductive to make the volatile memory circuits A1 to A3 writeable and, at the same time, the reading selecting TFTs 623, 627, and 631 are turned conductive to make the volatile memory circuits B1 to B3 readable. On the other hand, during the period in which signals are written in the volatile memory circuits B1 to B3, the writing selecting TFTs 622, 626, and 630 are turned conductive to make the volatile memory circuits B1 to B3 writeable and, at the same time, the reading selecting TFTs 621, 625, and 629 are turned conductive to make the volatile memory circuits A1 to A3 readable. To summarize, the volatile memory circuits A1 to A3 and B1 to B3 in the pixel of this embodiment alternately switches between writing and reading over every new frame period.

The operation of writing in the volatile memory circuits B1 to B3 and the operation of reading out of the volatile memory circuits B1 to B3 are the same as the volatile memory circuits A1 to A3. When writing signals in the volatile memory circuits B1 to B3 is finished, the frame period γ is started to move on to the display period for the second frame. Concurrently, digital video signals of the next frame period is processed in the frame period γ. The procedure is the same as the one described above up through holding the digital video signals in the latch circuits 502. In the subsequent volatile memory circuit writing period, the volatile memory circuits A1 to A3 are again used.

Thereafter, the digital video signals stored in the volatile memory circuits A1 to A3 are displayed in the frame period δ, and digital video signals of the next frame period simultaneously begin to receive processing. The digital video signals of the next frame period are stored again in the volatile memory circuits B1 to B3 that have finished their operations related to display of the second frame period.

The operation of writing digital video signals in the non-volatile memory circuits C1 to C3 and the operation of reading digital video signals out of the non-volatile memory circuits C1 to C3 are the same as Embodiment Mode.

The procedure above is repeated to display an image. When the image to be displayed is a still image, the source signal line driver circuit stops its operation after digital video signals of some frame are written in the memory circuits, and the image is displayed by reading the same signals stored in the memory circuits each time a new frame period is started. In the case where a still image is displayed after power supply to the display device is shut off once and then the display device is turned on, digital video signals stored in the non-volatile memory circuits C1 to C3 are read to display the still image. In this way, power consumption during still image display can be reduced greatly. Furthermore, the number of latch circuits is reduced to half the number of latch circuits in Embodiment 1. This embodiment is therefore space-saving in arrangement of the circuits, and can contribute to overall size reduction of the display device.

Embodiment 3

This embodiment describes an example of a liquid crystal display device to which the circuit structure of the liquid crystal display device shown in Embodiment 2 and having no second latch circuit is applied, and which employs dot-sequential driving to write signals in memory circuits in each pixel.

Figure 17:
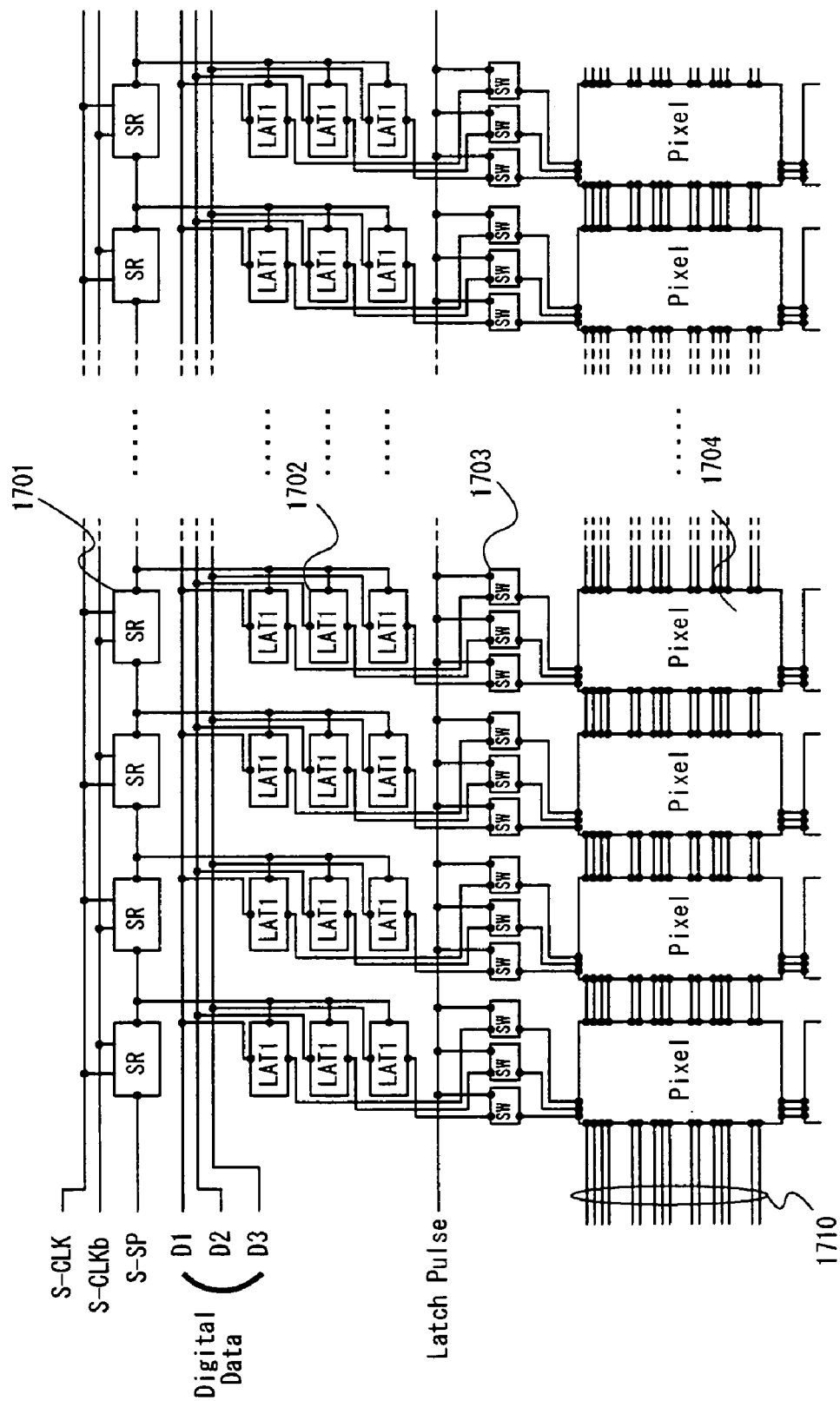
FIG. 17 is a diagram showing an example of the circuit structure of a source signal line driver circuit having no second latch circuit.

FIG. 17 shows an example of the circuit structure for a source signal line driver circuit of a liquid crystal display device according to this embodiment. The circuit is capable of handling 3 bit digital gray scale signals, and is composed of shift register circuits 1701, latch circuits 1702, switching circuits 1703, and pixels 1704. Denoted by 1710 are signal lines to which signals are supplied from a gate signal line driver circuit, or directly from the external. The circuit structure of the pixels is the same as Embodiment 2, and hence FIG. 6 can be referred to as it is.

Figure 18A:
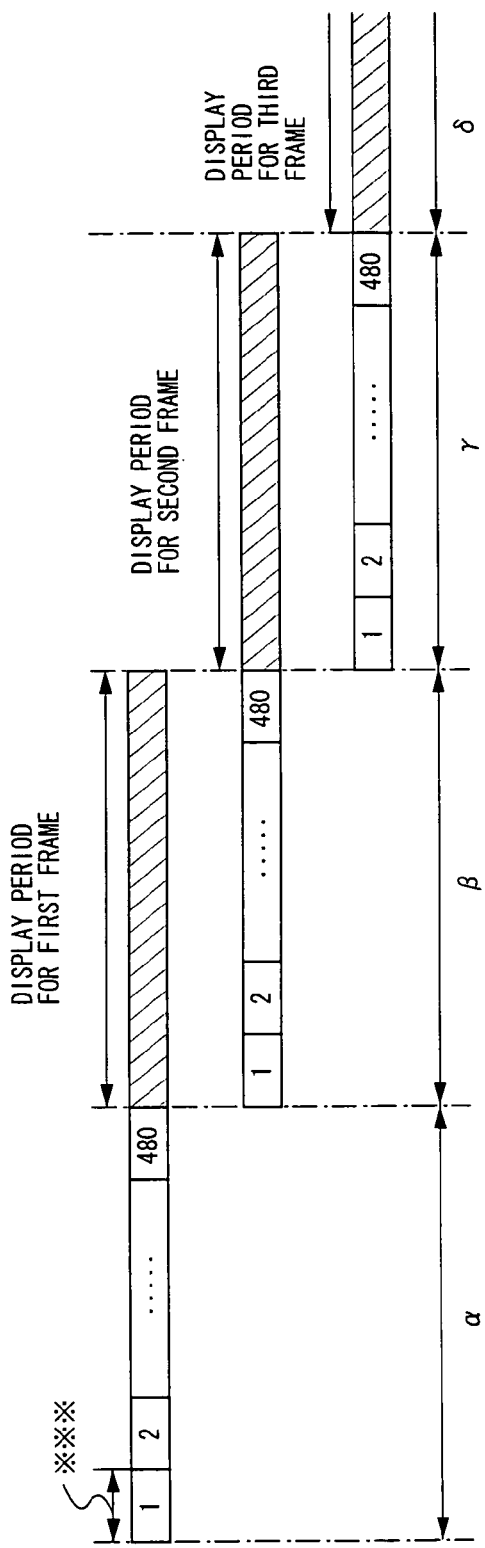
FIGS. 18A to 18C are timing charts for displaying an image using the circuit shown in FIG. 17.
Figure 18B:
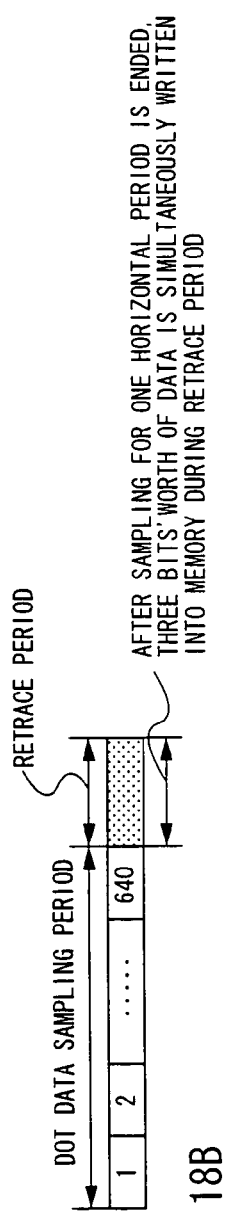
Figure 18C:
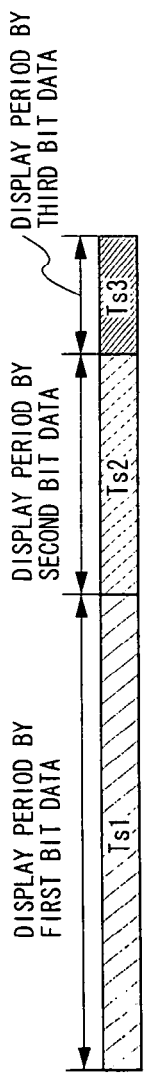

FIGS. 18A to 18C are timing charts regarding driving of the circuit of this embodiment. The description will be given with reference to FIG. 6, FIG. 17 and FIGS. 18A to 18C.

The operations from outputting sampling pulses from the shift register circuits 1701 through holding digital video signals in the latch circuits 1702 in response to the sampling pulses are the same as Embodiments 1 and 2. In this embodiment, the switching circuits 1703 are placed between the latch circuits 1702 and the volatile memory circuits in the pixels 1704. Therefore writing in the volatile memory circuits does not start immediately after completing holding the digital video signals in the latch circuits. The switching circuits 1703 are kept closed until the dot data sampling period is ended, and the latch circuits continue to hold the digital video signals as long as the switching circuits are closed.

As shown in FIG. 18B, the switching circuits 1703 are opened all at once upon receiving input of latch signals (latch pulses) during the retrace period that follows completion of holding digital video signals corresponding to one horizontal period. Then the digital video signals held in the latch circuits 1702 are simultaneously written in the volatile memory circuits in the pixels 1704. The operation in the pixels 1704 during this writing operation, and the operation in the pixels 1704 during reading operation for display in the next frame period are the same as Embodiment 2, and hence explanations thereof are omitted here. Also, how and when to write data in non-volatile memory circuits is the same as Embodiment 2, and hence explanations thereof will not be repeated.

In this way, driving in accordance with dot-sequential system can easily be made also when a source signal line driver circuit has no second latch circuit.

Embodiment 4

In Embodiment 4, a method of manufacturing TFTs of a pixel portion, a driver circuit portion (source signal line driver circuit, gate signal line driver circuit and pixel selection signal line driven circuit) formed in the periphery thereof in an active EL display device of the present invention simultaneously and a non-volatile storage circuit at the same time is explained. Note that a CMOS circuit which is a base unit is illustrated as the driver circuit portion to make a brief explanation.

Figure 9:
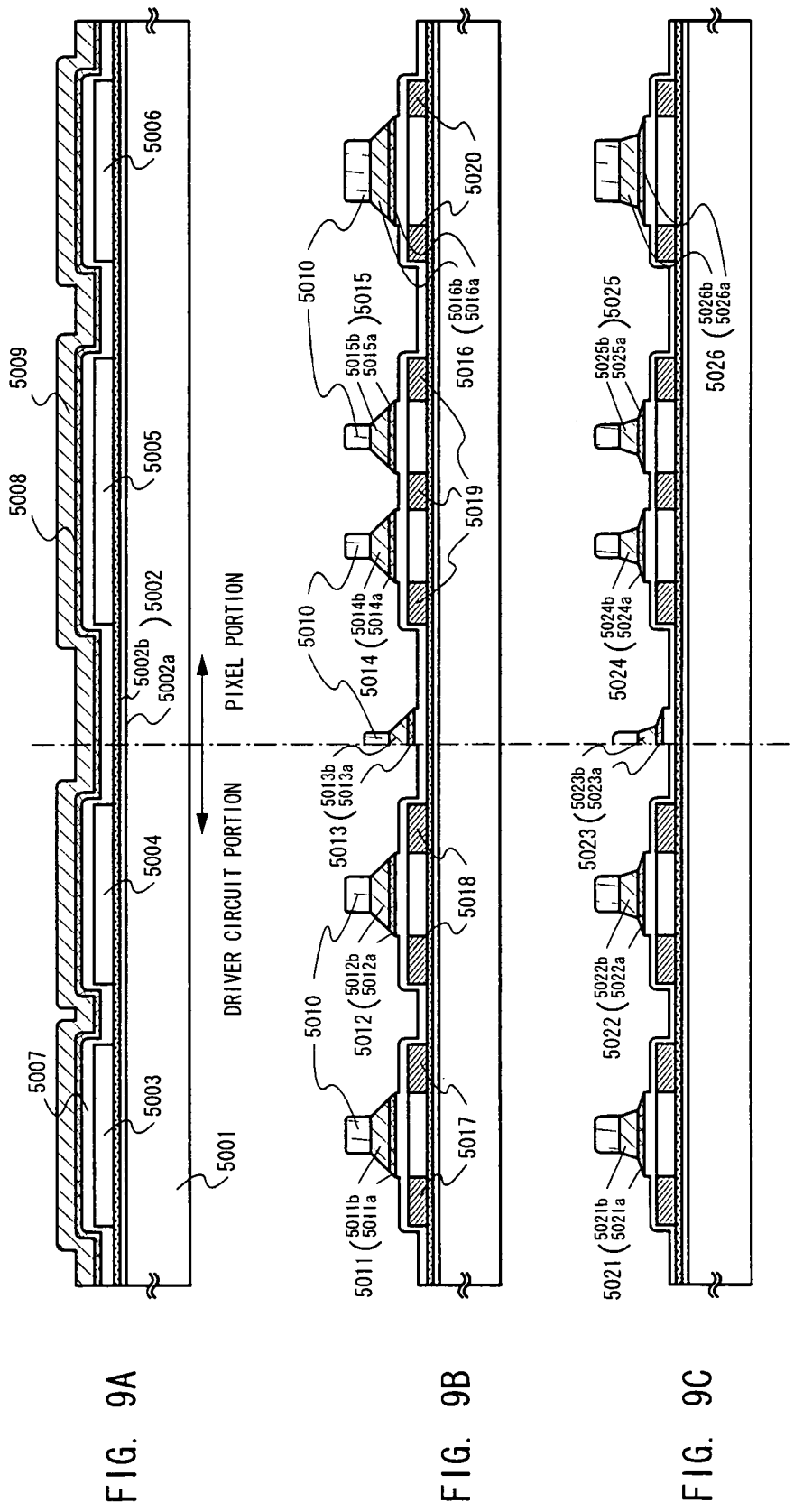
FIGS. 9A to 9C are diagrams exemplary showing a process of manufacturing a liquid crystal display device that has a pixel of the present invention.

First, as shown in FIG. 9A, a base film 5002 made from an insulating film such as a silicon oxide film, a silicon nitride film, or a silicon nitride oxide film is formed on a substrate 5001 made from glass such as barium borosilicate glass or aluminum borosilicate glass, typically Corning Corp. #7059 glass or #1737 glass. For example, a silicon nitride oxide film 5002a made from $SiH_4$, $NH_3$, and $N_2O$ by plasma CVD is formed with a thickness of 10 to 200 nm (preferably from 50 to 100 nm), and a hydrogenized silicon nitride oxide film 5002b with a thickness of 50 to 200 nm (preferably between 100 and 150 nm), made from $SiH_4$ and $N_2O$, is similarly formed and laminated. The base film 5002 is shown as a two layer structure in Embodiment 4, but it may also be formed as a single layer of the above insulating films, and it may also be formed having a lamination structure in which two layers or more are laminated.

Island shape semiconductor layers 5003 to 5006 are formed by a crystalline semiconductor film manufactured using a laser crystallization method of a semiconductor film having an amorphous structure, or using a known thermal crystallization method. The thickness of the island-shape semiconductor layers 5003 to 5006 is formed to a thickness of 25 to 80 nm (preferably between 30 and 60 nm). There are no limitations in the crystalline semiconductor film material, but it is preferable to form the film from a silicon or a silicon germanium (SiGe) alloy.

A laser such as a pulse emission type or continuous emission type excimer laser, a YAG laser, and a $YVO_4$ laser can be used in the laser crystallization method to manufacture a crystalline semiconductor film. A method of condensing laser light emitted from a laser oscillator into a linear shape by an optical system and then irradiating the light to the semiconductor film may be used when these types of lasers are used. The crystallization conditions may be suitably selected by the operator, but when using the excimer laser, the pulse emission frequency is set to 30 Hz, and the laser energy density is set from 100 to 400 mJ/cm$^2$ (typically between 200 and 300 mJ/cm$^2$). Further, the second harmonic is utilized when using the YAG laser, the pulse emission frequency is set from 1 to 10 KHz, and the laser energy density may be set from 300 to 600 mJ/cm$^2$ (typically between 350 and 500 mJ/cm$^2$). The laser light collected into a linear shape with a width of 100 to 1000 µm, for example 400 µm, is then irradiated over the entire surface of the substrate. This is performed with an overlap ratio of 80 to 98% for the linear shape laser light.

A gate insulating film 5007 is formed covering the semiconductor layers 5003 to 5006. A gate insulating film 5007 is formed by an insulating film containing silicon with a thickness of 40 to 150 nm by plasma CVD or sputtering. A 120 nm thick silicon nitride oxide film is formed in Embodiment 4. The gate insulating film is not limited to this type of silicon nitride oxide film, of course, and other insulating films containing silicon may also be used, in a single layer or in a lamination structure. For example, when using a silicon oxide film, it can be formed by plasma CVD with a mixture of TEOS (tetraethyl orthosilicate) and O$_2$, at a reaction pressure of 40 Pa. with the substrate temperature set from 300 to 400° C., and by discharging at a high frequency (13.56 MHz) electric power density of 0.5 to 0.8 W/cm$^2$. Good characteristics as a gate insulating film can be obtained by subsequently performing thermal annealing, at between 400 and 500° C., of the silicon oxide film thus manufactured.

A first conductive film 5008 and a second conductive film 5009 are then formed on the gate insulating film 5007 in order to form gate electrodes. The first conductive film 5008 is formed from Ta (tantalum) with a thickness of 50 to 100 nm, and the second conductive film 5009 is formed from W (tungsten) having a thickness of 100 to 300 nm, in Embodiment 4.

The Ta film is formed by sputtering of a Ta target by Ar. If appropriate amounts of Xe and Kr are added to Ar at the time of sputtering, the internal stress of the Ta film is relaxed, and film peeling can be prevented. The resistivity of an α phase Ta film is on the order of 20 µΩm, and it can be used in the gate electrode, but the resistivity of a β phase Ta film is on the order of 180 µΩcm and it is unsuitable for the gate electrode. An α phase Ta film can easily be obtained if a tantalum nitride film, which possesses a crystal structure near that of α phase Ta, is formed with a thickness of about 10 to 50 nm as a base for Ta in order to form α phase Ta.

The W film is formed by sputtering with a W target, which can also be formed by thermal CVD using tungsten hexafluoride (WF$_6$). Whichever is used, it is necessary to be able to make the film become low resistance in order to use it as the gate electrode, and it is preferable that the resistivity of the W film be made equal to or less than 20 µΩcm. The resistivity can be lowered by enlarging the crystal grains of the W film, but for cases in which there are many impurity elements such as oxygen in the W film, crystallization is inhibited, and the film becomes high resistance. A W target having a purity of 99.9999% is thus used in sputtering. In addition, by forming the W film while taking sufficient care that no impurities from within the gas phase are introduced at the time of film formation, a resistivity of 9 to 20 µΩcm can be achieved.

Note that, although the first conductive film 5008 is Ta and the second conductive film 5009 is W in Embodiment 4, the conductive films are not limited to these, and both may also be formed from an element selected from the group consisting of Ta, W, Ti, Mo, Al, and Cu, or from an alloy material having one of these elements as its main component, or from a chemical compound of these elements. Further, a semiconductor film, typically a polysilicon film into which an impurity element such as phosphorous is doped, may also be used. Examples of preferable combinations other than that used in Embodiment 4 include: forming the first conductive film 5008 by tantalum nitride (TaN) and combining it with the second conductive film 5009 formed from W; forming the first conductive film 5008 by tantalum nitride (TaN) and combining it with the second conductive film 5009 formed from Al; and forming the first conductive film 5008 by tantalum nitride (TaN) and combining it with the second conductive film 5009 formed from Cu.

Then, a mask 5010 is formed from resist, and a first etching process is performed in order to form electrodes and wirings. An ICP (inductively coupled plasma) etching method is used in Embodiment 4. A gas mixture of CF$_4$ and Cl$_2$ is used as an etching gas, and a plasma is generated by applying a 500 W RF electric power (13.56 MHz) to a coil shape electrode at a pressure of 1 Pa. A 100 W RF electric power (13.56 MHz) is also applied to the substrate side (test piece stage), effectively applying a negative self-bias voltage. The W film and the Ta film are both etched on the same order when CF$_4$ and Cl$_2$ are combined.

The edge portions of the first conductive layer and the second conductive layer are made into a tapered shape in accordance with the effect of the bias voltage applied to the substrate side under the above etching conditions by using a suitable resist mask shape. The angle of the tapered portions is from 15 to 45°. The etching time may be increased by approximately 10 to 20% in order to perform etching without any residue remaining on the gate insulating film. The selectivity of a silicon nitride oxide film with respect to a W film is from 2 to 4 (typically 3), and therefore approximately 20 to 50 nm of the exposed surface of the silicon nitride oxide film is etched by this over-etching process. In this way, the first shape conductive layers 5011 to 5016 are thus formed from the first conductive layers and the second conductive layers (the first conductive layers 5011a to 5016a and the second conductive layers 5011b to 5016b) in accordance with the first etching process. At this time, regions of the gate insulating film 5007 not covered by first shape conductive layers 5011 to 5016 are made thinner by about 20 to 50 nm. (FIG. 9B)

A first doping process is then performed, and an impurity element which imparts n-type conductivity is added. The doping can be carried out by ion doping or ion implantation. Ion doping is performed under conditions of a dose amount from $1\times10^{13}$ to $5\times10^{14}$ atoms/cm$^2$ and an acceleration voltage of 60 to 100 keV. An element in periodic table group 15, typically phosphorous (P) or arsenic (As) is used as the impurity element which imparts n-type conductivity, and phosphorous (P) is used here. The conductive layers 5011 to 5016 become masks with respect to the n-type conductivity imparting impurity element in this case, and the first impurity regions 5017 to 5020 are formed in a self-aligning manner. The impurity element which imparts n-type conductivity is added to the first impurity regions 5017 to 5020 at a concentration in the range of $1\times10^{20}$ to $1\times10^{21}$ atoms/cm$^3$. (FIG. 9B)

Next, as shown in FIG. 9C, a second etching process is performed without removing the resist mask. The etching gas of the mixture of CF$_4$, Cl$_2$ and O$_2$ is used, and the W film is selectively etched. At this point, second shape conductive layers 5021 to 5026 (first conductive layers 5021a to 5026a and second conductive layers 5021b to 5026b) are formed by the second etching process. Regions of the gate insulating film 5007, which are not covered with the second shape conductive layers 5021 to 5026 are made thinner by about 20 to 50 nm by etching.

An etching reaction of the W film or the Ta film by the mixture gas of CF$_4$ and Cl$_2$ can be guessed from a generated radical or ion species and the vapor pressure of a reaction product. When the vapor pressures of fluoride and chloride of W and Ta are compared with each other, the vapor pressure of WF$_6$ of fluoride of W is extremely high, and other WCl$_5$, TaF$_5$, and TaCl$_5$ have almost equal vapor pressures. Thus, in the mixture gas of CF$_4$ and Cl$_2$, both the W film and the Ta film are etched. However, when a suitable amount of O$_2$ is added to this mixture gas, CF$_4$ and O$_2$ react with each other to form CO and F, and a large number of F radicals or F ions are generated. As a result, an etching rate of the W film having the high vapor pressure of fluoride is increased. On the other hand, with respect to Ta, even if F is increased, an increase of the etching rate is relatively small. Besides, since Ta is easily oxidized as compared with W, the surface of Ta is oxidized by addition of O$_2$ Since the oxide of Ta does not react with fluorine or chlorine, the etching rate of the Ta film is further decreased. Accordingly, it becomes possible to make a difference between the etching rates of the W film and the Ta film, and it becomes possible to make the etching rate of the W film higher than that of the Ta film.

Figure 10:
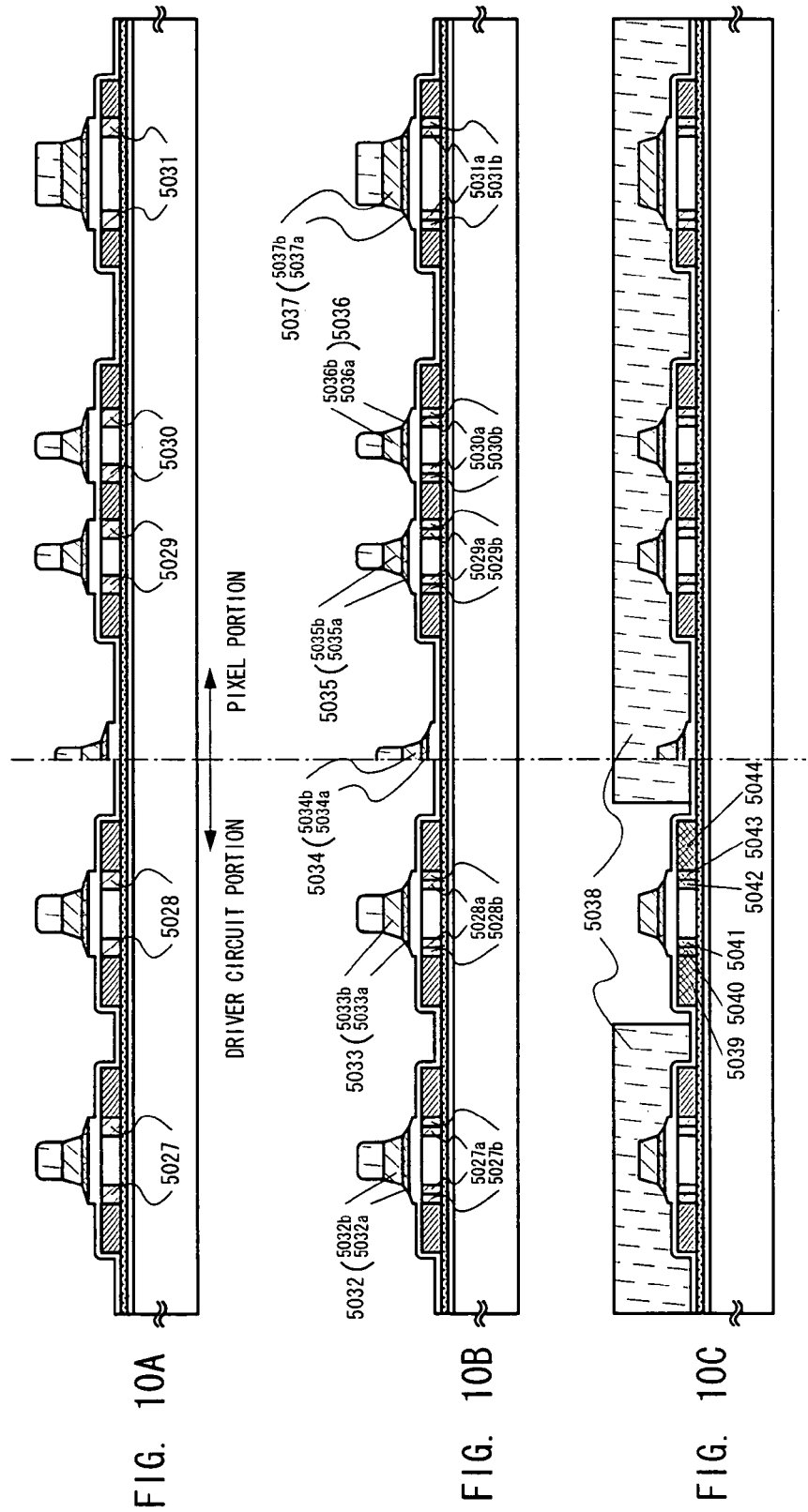
FIGS. 10A to 10C are diagrams exemplary showing a process of manufacturing a liquid crystal display device that has a pixel of the present invention.

Then, as shown in FIG. 10A, a second doping process is performed. In this case, a dosage is made lower than that of the first doping process and under the condition of a high acceleration voltage. an impurity element for imparting the n-type conductivity is doped. For example, the process is carried out with an acceleration voltage set to 70 to 120 keV and at a dosage of $1\times10^{13}$ atoms/cm$^2$, so that new impurity regions are formed inside of the first impurity regions formed into the island-shape semiconductor layers in FIG. 10B. Doping is carried out such that the second shape conductive layers 5021 to 5026 are used as masks to the impurity element and the impurity element is added also to the regions under the first conductive layers 5021a to 5026a. In this way, second impurity regions 5027 to 5031 are formed. The concentration of phosphorous (P) added to the third impurity regions 5027 to 5031 has a gentle concentration gradient in accordance with the thickness of tapered portions of the first conductive layers 5021a to 5026a. Note that in the semiconductor layer that overlap with the tapered portions of the first conductive layers 5021a to 5026a, the impurity concentration slightly falls from the end portions of the tapered portions of the first conductive layers 5021a to 5026a toward the inner portions, but the concentration keeps almost the same level.

As shown in FIG. 10B, a third etching process is performed using the etching gas of CHF$_6$, and a reactive ion etching (RIE method) is used. By the third etching process, the tapered portion of the first conductive layers 5021a to 5026a are partly etched to contract the overlapping region of the first conductive layers with a semiconductor layer. Third shape conductive layers 5037 to 5040 (first conductive layers 5032a to 5037a and second conductive layers 5032b to 5037b) are formed by the third etching process. Regions of the gate insulating film 5007, which are not covered with the third shape conductive layers 5032 to 5037 are made thinner by about 20 to 50 nm by etching.

By the third etching process, second impurity regions 5027a to 5013a that overlap with the first conductive layers 5032a to 5037a and third impurity regions 5027b to 5031b between the first impurity region and the third impurity region, are formed in the second impurity regions 5027 to 5031.

Fourth impurity regions 5039 to 5044 having a conductivity type which is the opposite of the first conductive type, are then formed as shown in FIG. 10C in the island shape semiconductor layer 5004 which forms p-channel TFTs. The third shape conductive layer 5033b is used as a mask with respect to the impurity element, and the impurity regions are formed in a self-aligning manner. The island shape semiconductor layers 5003 and 5005, which form n-channel TFTs, are covered over their entire surface areas by resist masks 5038. Phosphorous is added in differing concentration to the impurity regions 5039 to 5044, and ion doping is performed here using diborane (B$_2$H$_6$), so that the impurity concentration in the regions becomes from $2\times10^{20}$ to $2\times10^{21}$ atoms/cm$^3$.

Impurity regions are formed in the respective island shape semiconductor layers by the above processes. The third shape conductive layers 5032, 5033, 5035 and 5036 overlapping the island shape semiconductor layers function as gate electrodes. Reference numeral 5037 functions as floating gate electrode of the memory cell. Also reference numeral 5034 functions island shape source signal line. (FIG. 10C)

Figure 11:
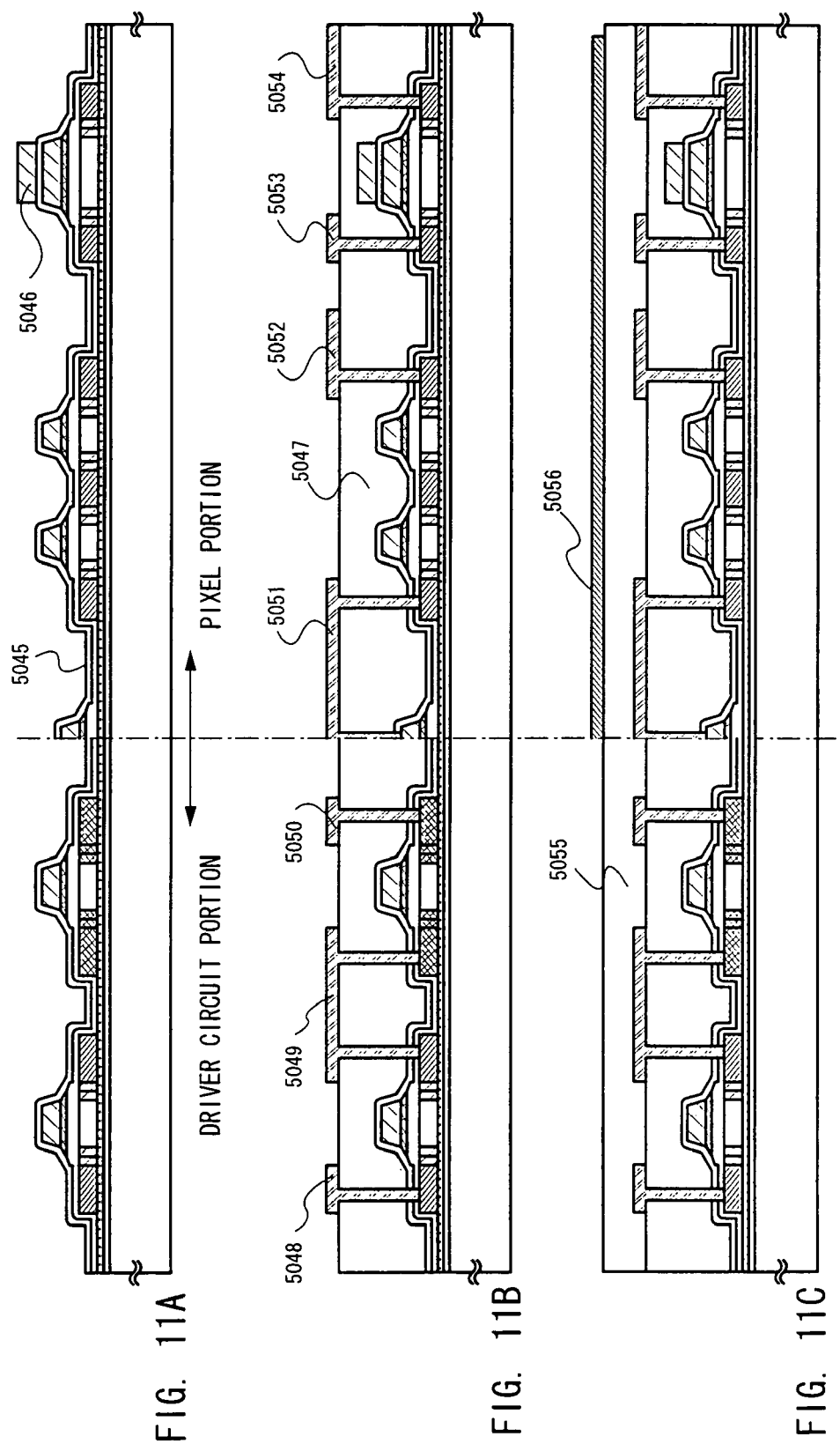
FIGS. 11A to 11C are diagrams exemplary showing a process of manufacturing a liquid crystal display device that has a pixel of the present invention.

After removing the resist mask 5038, the second gate insulating film is formed as shown in FIG. 11A. A thickness of the second gate insulating film 5045 may be 10 to 250 nm. It can be using known gas phase method (plasma CVD or sputtering and so on) as a method of film formation. Not that SiNO film is formed by plasma CVD having a thickness of 70 nm, in Embodiment 4.

A process of activating the impurity elements added to the respective island shape semiconductor layers is then performed with the aim of controlling conductivity type. Thermal annealing using an annealing furnace is performed for this process. In addition, laser annealing and rapid thermal annealing (RTA) can also be applied. Thermal annealing is performed with an oxygen concentration equal to or less than 1 ppm, preferably equal to or less than 0.1 ppm, in a nitrogen atmosphere at 400 to 700° C., typically between 500 and 600° C. Heat treatment is performed for 4 hours at 500° C. in Embodiment 4. However, for cases in which the wiring material used in the third shape conductive layers 5037 to 5040 is weak with respect to heat, it is preferable to perform activation after forming an interlayer insulating film (having silicon as its main constituent) in order to protect the wirings and the like.

In addition, heat treatment is performed for 1 to 12 hours at 300 to 450° C. in an atmosphere containing between 3 and 100% hydrogen, performing hydrogenation of the island shape semiconductor layers. This process is one of terminating dangling bonds in the island shape semiconductor layers by hydrogen which is thermally excited. Plasma hydrogenation (using hydrogen excited by a plasma) may also be performed as another means of hydrogenation.

Thereafter, a conductive film with a thickness of 200 to 400 nm is formed and patterned to form a control gate electrode 5046. The control gate electrode 5046 is formed such that it partially or entirely overlaps a floating gate electrode 5037 with the second gate insulating film 5045 sandwiched therebetween (FIG. 11A).

A first interlayer insulating film 5047 is formed from a silicon oxynitride film having a thickness of 100 to 200 nm. Formed next are source wiring lines 5048 and 5050 contacting the source region of the island-like semiconductor layer in the driver circuit portion, and a drain wiring line 5049 contacting the drain region thereof. In the pixel portion, connector electrodes 5051 and 5052 are formed. At the same time, connector electrodes 5053 and 5054 are formed in the memory cell portion. The connector electrode 5051 forms an electrical connection between the source signal line 5034 and the pixel TFT (FIG. 11B).

A second interlayer insulating film 5055 is formed thereon from an organic insulating material, and a pixel electrode 5056 is formed next. When the display device to be manufactured is a reflective liquid crystal display device as the one shown in this embodiment, the pixel electrode 5056 is desirably formed of a material having high reflectance, such as a film mainly containing Al or Ag or a laminate of a Al film and a Ag film.

In the manner described above, a driver circuit portion having an n-channel TFT and a p-channel TFT can be formed on the same substrate on which a pixel portion having a pixel TFT and volatile memory circuits is formed as shown in FIG. 11C. A substrate such as this is called an active matrix substrate in this specification.

Figure 12:
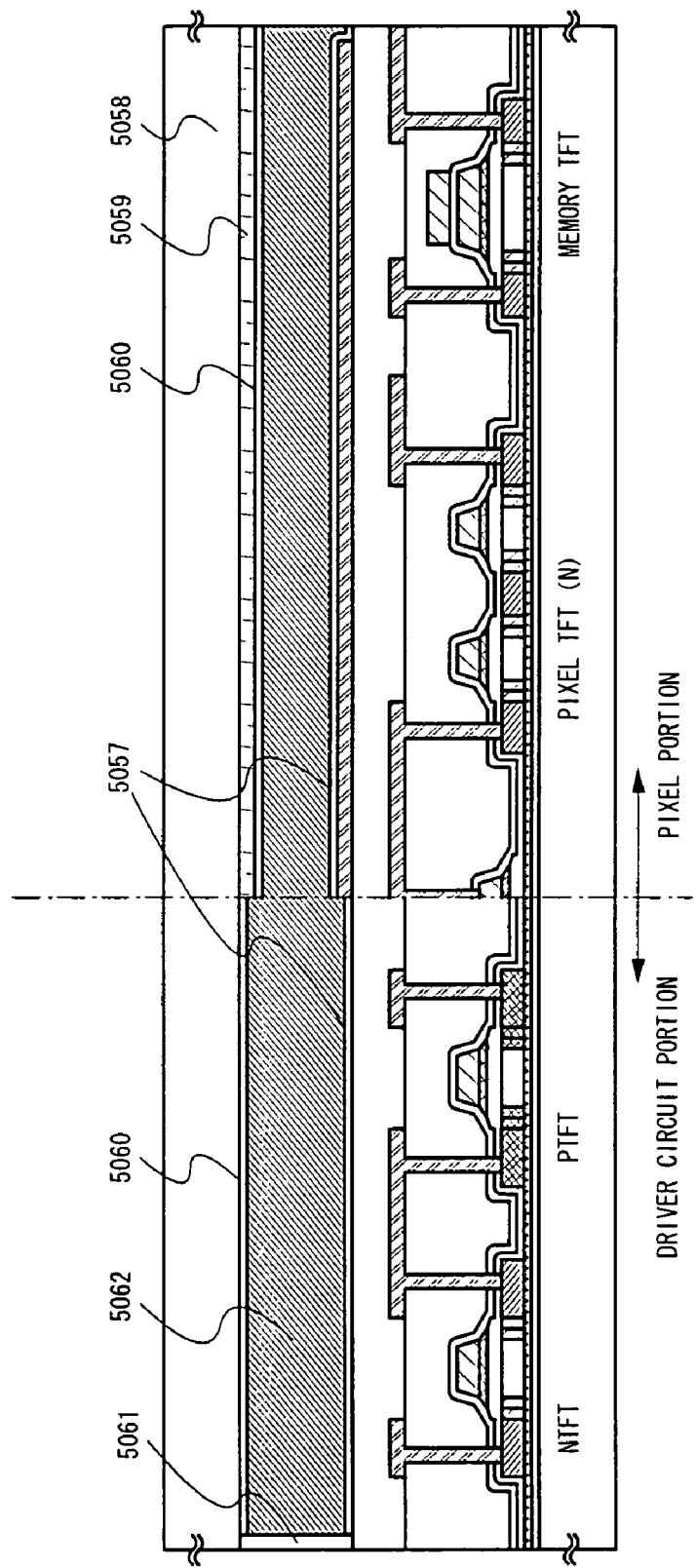
FIG. 12 is a diagram exemplary showing a process of manufacturing a liquid crystal display device that has a pixel of the present invention.
Figure 13:
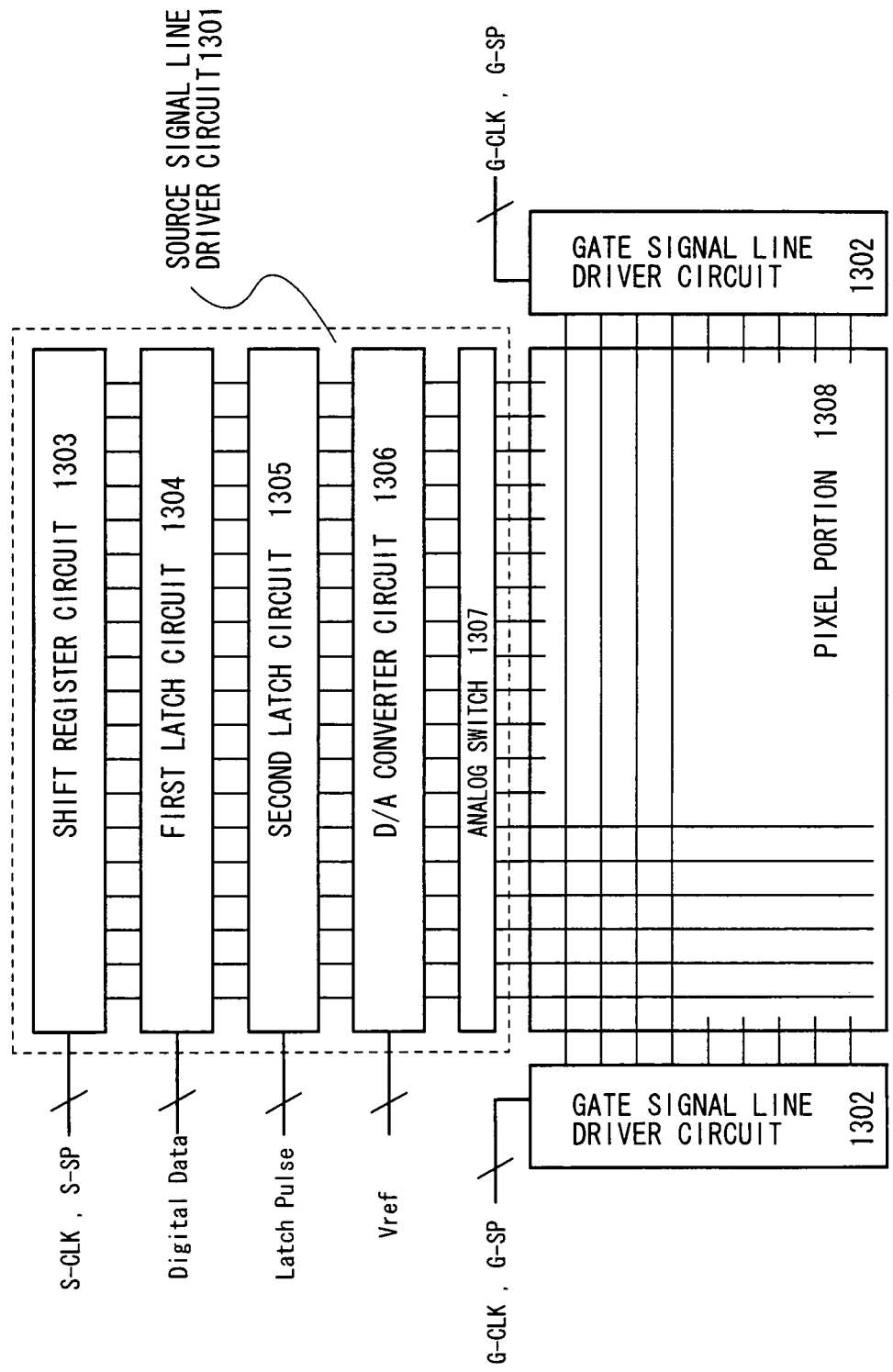
FIG. 13 is a diagram showing in a simplified manner the entire circuit structure of a conventional liquid crystal display device.
Figure 14:
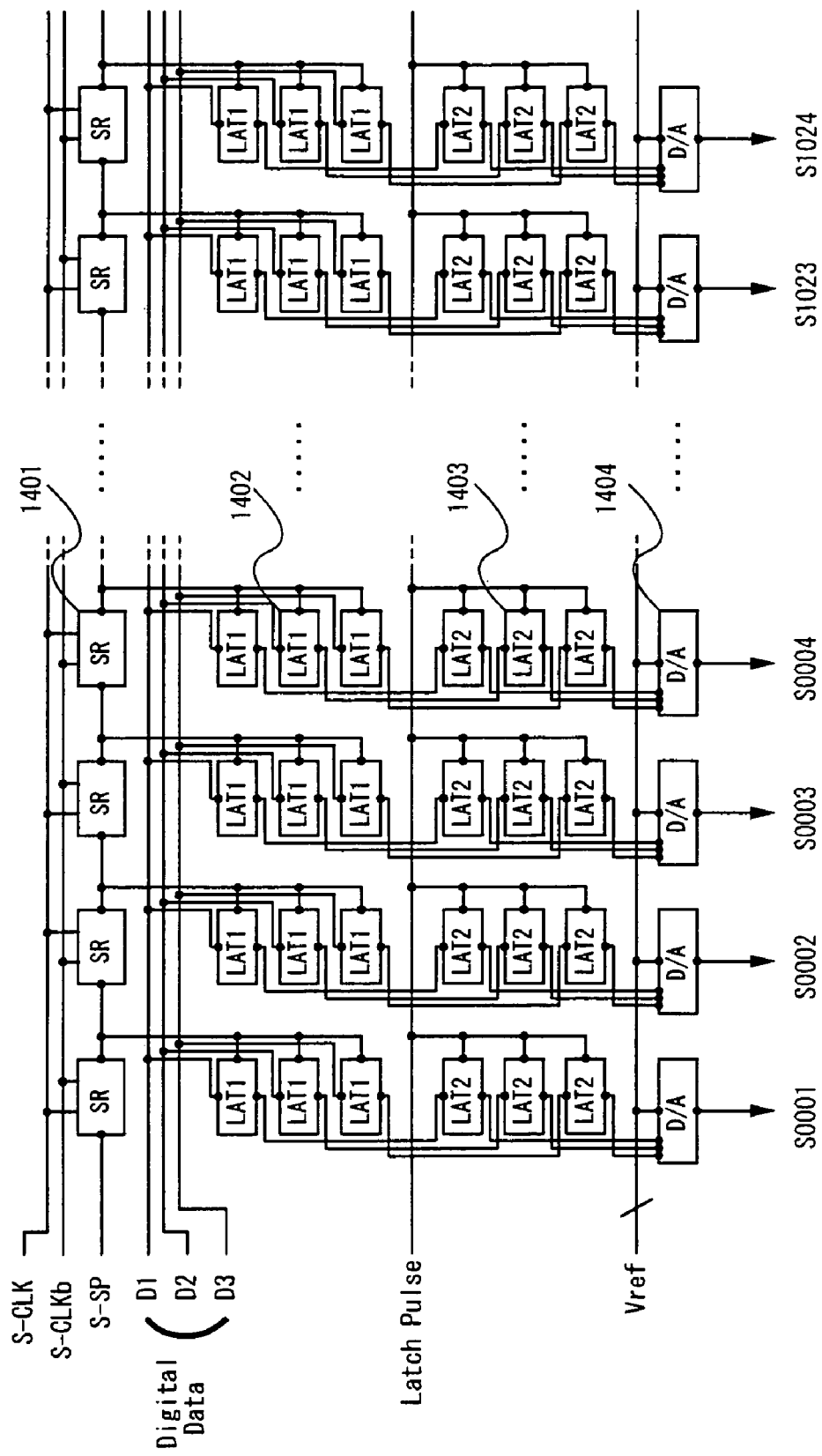
FIG. 14 is a diagram showing an example of the circuit structure of a source signal line driver circuit in a conventional liquid crystal display device.

After the active matrix substrate in the state of FIG. 11C is obtained an oriented film 5057 is formed on the active matrix substrate and subjected to rubbing treatment as shown in FIG. 12A.

An opposite substrate 5058 is prepared. On the opposite substrate 5058, an opposite electrode 5059 is formed by patterning and an oriented film 5060 is formed and subjected to rubbing treatment. The opposite electrode is formed of an ITO film or like other transparent conductive materials.

A spacer (not shown) is formed on the active matrix substrate or the opposite substrate. The spacer may be spherical beads sprayed to the substrate. Alternatively, a photosensitive resin is patterned into dots or stripes in a display region. The spacer prevents orientation defect of a liquid crystal material.

A desirable cell gap for the reflective liquid crystal display device of this embodiment is 0.5 to 1.5 μm, considering retardation. In this embodiment, the cell gap in the pixel portion is set to 1.0 μm.

The active matrix substrate on which the pixel portion and the driver circuit portion are formed is then bonded to the opposite substrate using a seal 5061. The seal 5061 has a filler mixed therein, and the filler, together with the spacer, keeps the distance uniform between the two substrates when they are bonded. A liquid crystal material 5062 is injected between the substrates, and then the substrates are completely sealed by an end sealing material (not shown). The liquid crystal material 5062 may be a known liquid crystal material. Thus completed is an active matrix liquid crystal display device shown in FIG. 12A.

The TFTs have a top gate structure in the active matrix liquid crystal display device manufactured by the above process. However, this embodiment can readily be applied to cases in which TFTs have a bottom gate structure or other structures.

Although a glass substrate is used in this embodiment. the substrate is not limited to the glass substrate. This embodiment can be carried out also with a plastic substrate, a stainless steel substrate, a single crystal wafer, and the like.

The description given in this embodiment takes a reflective liquid crystal display device as an example. However, with a pixel electrode structured differently, the present invention can readily be applied to a transmissive liquid crystal display device and to a semi-transmissive display device in which half the pixels have reflective electrodes and the rest of the pixels have transparent electrodes.

Embodiment 5

The display device of the present invention employs the time gray scale method to obtain gray scale display. Accordingly, if pixels have liquid crystal elements, a quicker response is required than the usual analog gray scale method and it is desirable to use a ferroelectric liquid crystal (FLC). This embodiment describes an example of fabricating a substrate suitable for a liquid crystal element made of a ferroelectric liquid crystal through the display device manufacture process introduced in Embodiment 4.

An active matrix substrate shown in FIG. 19A (corresponding to FIG. 11C) is fabricated in accordance with Embodiment 4.

An opposite substrate 5058 is prepared. On the opposite substrate 5058, an opposite electrode 5059 is formed by patterning. The opposite electrode is formed of an ITO film or like other transparent conductive materials.

Oriented films 5101 and 5102 are formed on the active matrix substrate and the opposite substrate, respectively. An oriented film RN 1286, a product of Nissan Chemical Industries, LTD., is formed and pre-baked at 90° C. for five minutes before post-baking it at 250° C. for an hour. The thickness of the film after post-baking is 40 nm. The oriented film is formed by flexographic printing or spinner application. The RN 1286 adheres poorly to a seal, and hence the oriented film is removed from the positions where the seal is to be placed. Also, the oriented film is not formed on a contact pad for electrically connecting the active matrix substrate with the opposite substrate and on a lead wire for connecting a flexible printed circuit (FPC).

The oriented films 5101 and 5102 are subjected to rubbing treatment. In the rubbing treatment, the rubbing directions are set to be parallel to each other when the opposite substrate 5058 is bonded to the active matrix substrate. Rubbing cloth used in the rubbing treatment is YA-20R, a product of Yoshikawa Chemical. A rubbing apparatus produced by Joyo Engineering, Co., LTD. is used to subject the oriented films to rubbing once with the depression amount set to 0.25 mm, the roll rpm to 100 rpm, and the stage rate to 10 mm/sec. The diameter of the rubbing roll is 130 mm. After the rubbing, the oriented films are washed by running water over the substrate surfaces.

A seal 5103 is formed next. The seal is patterned into a shape having one liquid crystal material inlet so that the liquid crystal material can be injected in vacuum.

The seal is formed on the opposite substrate using a seal dispenser produced by Hitach Chemical Co., Ltd. The seal used is XN-21S, a product of Mitsui Chemicals, Inc. The seal is subjected to test baking at 90° C. for thirty minutes and then gradually cooled for the following fifteen minutes.

It is a known fact that the seal XN-21S can provide a cell gap of merely 2.3 to 2.6 μm even after subjected to thermal pressing. Then, in order to obtain a cell gap of 1.0 μm, the seal is arranged in a region where the laminate is thinner than the pixel portion by 1.5 μm or more. In this embodiment, the seal 5103 is placed in a region where a first interlayer insulating film 5047 and a second interlayer insulating film 5055 are removed by etching.

A conductive spacer (not shown) is formed at the same time the seal is formed.

The spacer (not shown) is formed on the active matrix substrate or the opposite substrate. The spacer may be spherical beads sprayed to the substrate. Alternatively, a photosensitive resin is patterned into dots or stripes in a display region. The spacer prevents orientation defect of a liquid crystal material.

A desirable cell gap for a reflective liquid crystal display device is 0.5 to 1.5 µm, considering retardation. In this embodiment, the cell gap in the pixel portion is set to 1.0 µm.

After that, with a bonding apparatus by Newtom Corporation, the active matrix substrate and the opposite substrate are bonded to each other by aligning markers on the substrates.

The seal is then thermally cured in a clean oven at 160° C. for three hours while applying a pressure of 0.3 to 1.0 kgf/cm$^2$ to the entire surfaces of the substrates in the direction perpendicular to the substrate plane. The opposite substrate and the active matrix substrate are thus bonded.

A pair of substrates consisting of the bonded opposite substrate and active matrix substrate are cut into pieces.

A liquid crystal material 5104 is a bistable ferroelectric liquid crystal or a tristable ferroelectric liquid crystal.

The liquid crystal material is heated until it reaches the isotropic phase and then injected. Thereafter, the liquid crystal material is gradually cooled at 0.1° C. per minute to room temperature (FIG. 19B).

A UV-curable resin (not shown) as an end-sealing material is applied by a small-sized dispenser so as to cover the liquid crystal material inlet.

The flexible printed board (not shown) is then bonded using an anisotropic conductive film (not shown) to complete an active matrix liquid crystal display device.

If a pixel electrode on the active matrix substrate is formed of a transparent conductive film, a transmissive liquid crystal display device can also be formed by the manufacture process of this embodiment. A desirable cell gap for the transmissive liquid crystal display device is 1.0 to 2.5 µm, considering retardation and avoiding the helical structure of the ferroelectric liquid crystal.

Embodiment 6

Static random access memories (SRAM) are used for the volatile memory circuits in the pixel portions of the liquid crystal display devices according to Embodiments 1 through 3 of the present invention. However, the volatile memory circuits are not limited to SRAM. Dynamic random access memories (DRAM) can be given as other volatile memory circuits employable by a pixel portion in a liquid crystal display device of the present invention. This embodiment shows an example of using various memory circuits.

Figure 8:
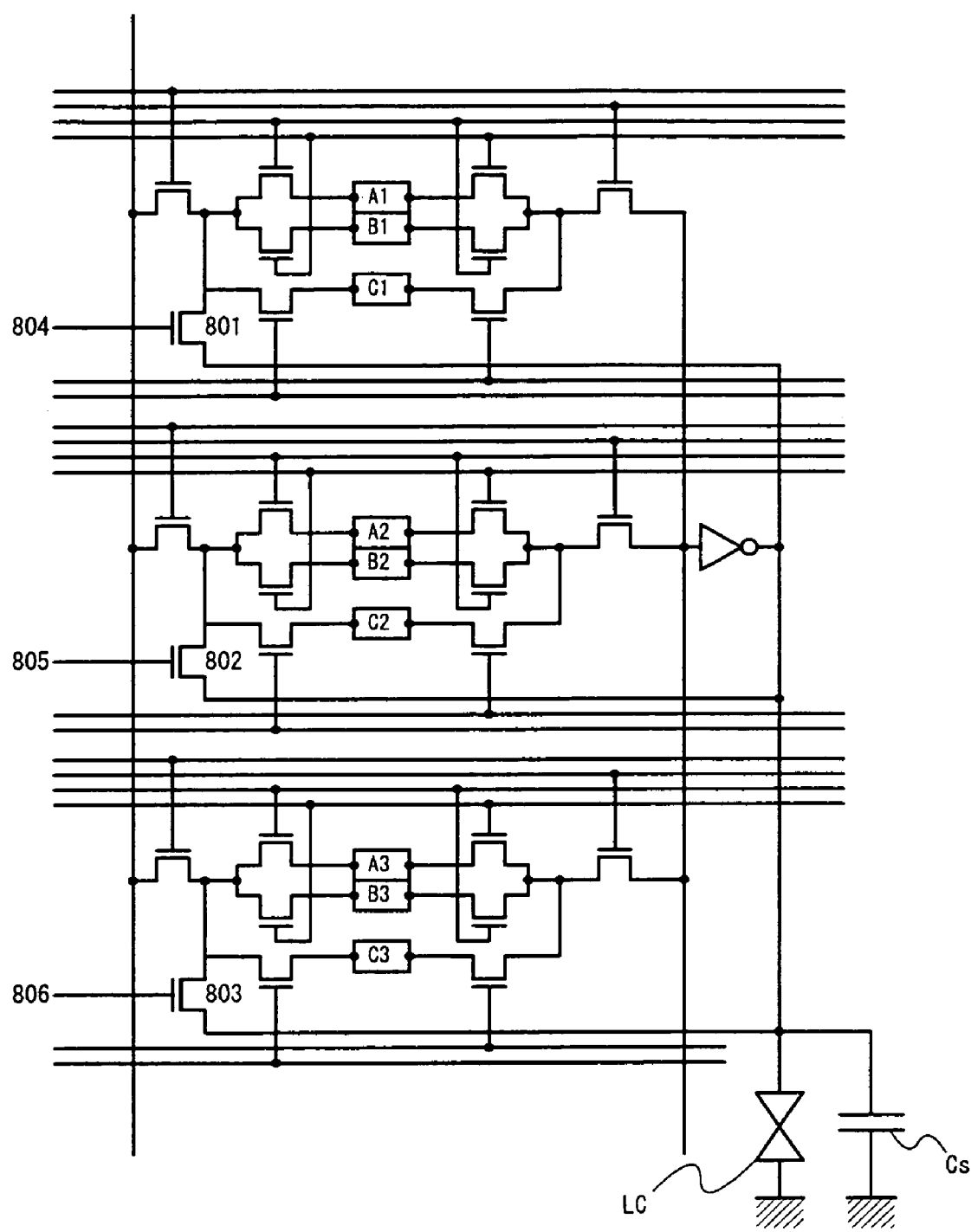
FIG. 8 is a detailed circuit diagram of a pixel of the present invention when the memory circuits are dynamic random access memories.

FIG. 8 shows the case in which DRAM is used for volatile memory circuits A1 to A3 and B1 to B3 arranged in a pixel. The basic structure thereof is the same as the circuits shown in Embodiment 1. The DRAM used for the volatile memory circuits A1 to A3 and B1 to B3 may have a general structure. In this embodiment, a relatively simple structure comprised of an inverter and a capacitor storage as shown in FIG. 8 is used.

The operation of a source signal line driver circuit is the same as Embodiment 1. Unlike SRAM, DRAM requires rewriting for once in a while (the rewriting operation is hereinafter referred to as refresh), and therefore is connected to refresh TFTs 801 to 803. Refresh is achieved by turning the refresh TFTs 801 to 803 conductive at some point in a still image display period (the period during which digital video signals stored in the volatile memory circuits are repeatedly read out to display a still image), so that electric charges in a pixel portion is returned to the volatile memory circuit side.

Still another format of memory circuits that can be used to constitute a pixel portion in a liquid crystal display device of the present invention is, though not shown in the drawing, ferroelectric random access memory (FeRAM). FeRAM is a non-volatile memory and having the same level of writing speed as SRAM and DRAM. Characteristics of FeRAM, including low writing voltage, can be utilized to further reduce power consumption of the liquid crystal display device of the present invention. Flash memories may also be used to constitute the memory circuits of the present invention.

Embodiment 7

An active matrix semiconductor display device made from a driver circuit of the present invention has various uses. In the present embodiment: a description will be given on a semiconductor device incorporating an active matrix semiconductor display device made from a driver circuit of the present invention.

The following can be given as examples of these semiconductor devices: a portable information terminal (such as an electronic book, a mobile computer, and a portable telephone), a video camera, a digital camera, a personal computer and a television. Examples of those are shown in FIGS. 15 and 16.

Figure 15A:
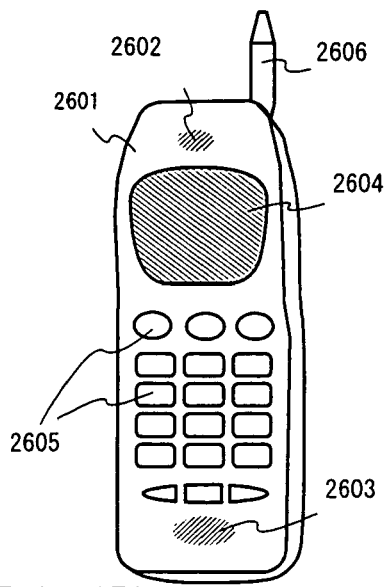
FIGS. 15A to 15F are diagrams showing examples of an electronic device to which a display device having a pixel of the present invention can be applied.

FIG. 15A is a portable telephone, and is composed of a main body 2601, an audio output portion 2602, an audio input portion 2603, a display portion 2604, operation switches 2605, and an antenna 2606. The present invention can be applied to the display portion 2604.

Figure 15B:
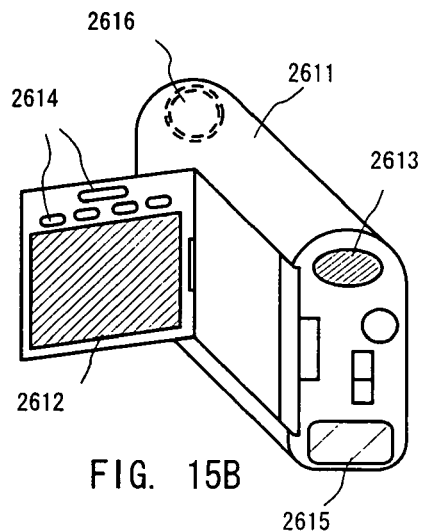

FIG. 15B is a video camera, and is composed of a main body 2611, a display portion 2612, an audio input portion 2613, operation switches 2614, a battery 2615. and an image receiving portion 2616. The present invention can be applied to the display portion 2612.

Figure 15C:
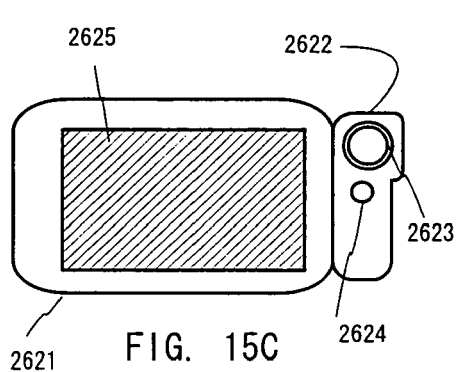

FIG. 15C is a mobile computer or a portable type information terminal, and is composed of a main body 2621, a camera portion 2622, an image receiving portion 2623, operation switches 2624, and a display portion 2625. The present invention can be applied to the display portion 2625.

Figure 15D:
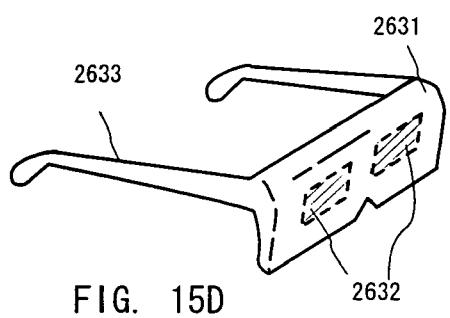

FIG. 15D is a head mount display, and is composed of a main body 2631, a display portion 2632, and an arm portion 2633. The present invention can be applied to the display portion 2632.

Figure 15E:
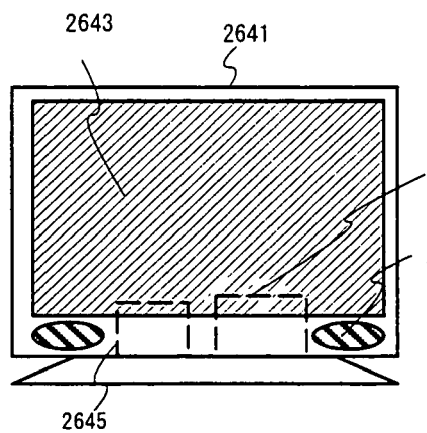

FIG. 15E is a television, and is composed of a main body 2641, speakers 2642, a display portion 2643, a receiving device 2644, and an amplification device 2645. The present invention can be applied to the display portion 2643.

Figure 15F:
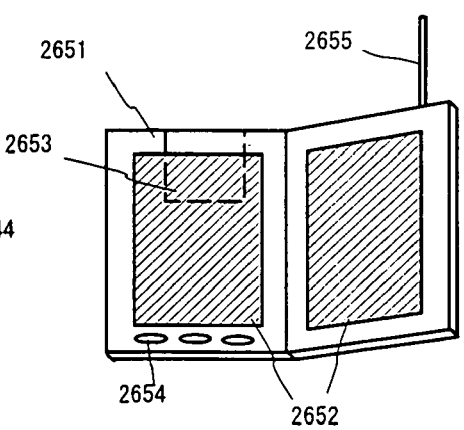

FIG. 15F is a portable electronic book, and is composed of a main body 2651, a display device 2652, a memory medium 2653, an operation switch 2654 and an antenna 2655. The book is used to display data stored in a mini-disk (MD) or a DVD (Digital Versatile Disk), or a data received with the antenna. The present invention can be applied to the display portion 2652.

FIG. 16A is a personal computer, and is composed of a main body 2701, an image inputting portion 2702, a display device 2703 and a keyboard 2704. The present invention can be applied to the display portion 2703.

FIG. 16B is a player that employs a recording medium in which programs are recorded, and is composed of a main body 2711, a display portion 2712, a speaker portion 2713, a recording medium 2714, and an operation switch 2715. Note that this player uses a DVD (Digital Versatile Disc), CD and the like as the recording medium to appreciate music and films, play games, and connect to the Internet. The present invention can be applied to the display portion 2612.

FIG. 16C is a digital camera comprising a main body 2721, a display portion 2722, an eye piece 2723, operation switches 2724, and an image receiving portion (not shown). The present invention can be applied to the display portion 2722.

FIG. 16D is a head mount display comprising a display portion 2731, and a band portion 2732. The present invention can be applied to the display portion 2731.

Embodiment 8

Figure 21:
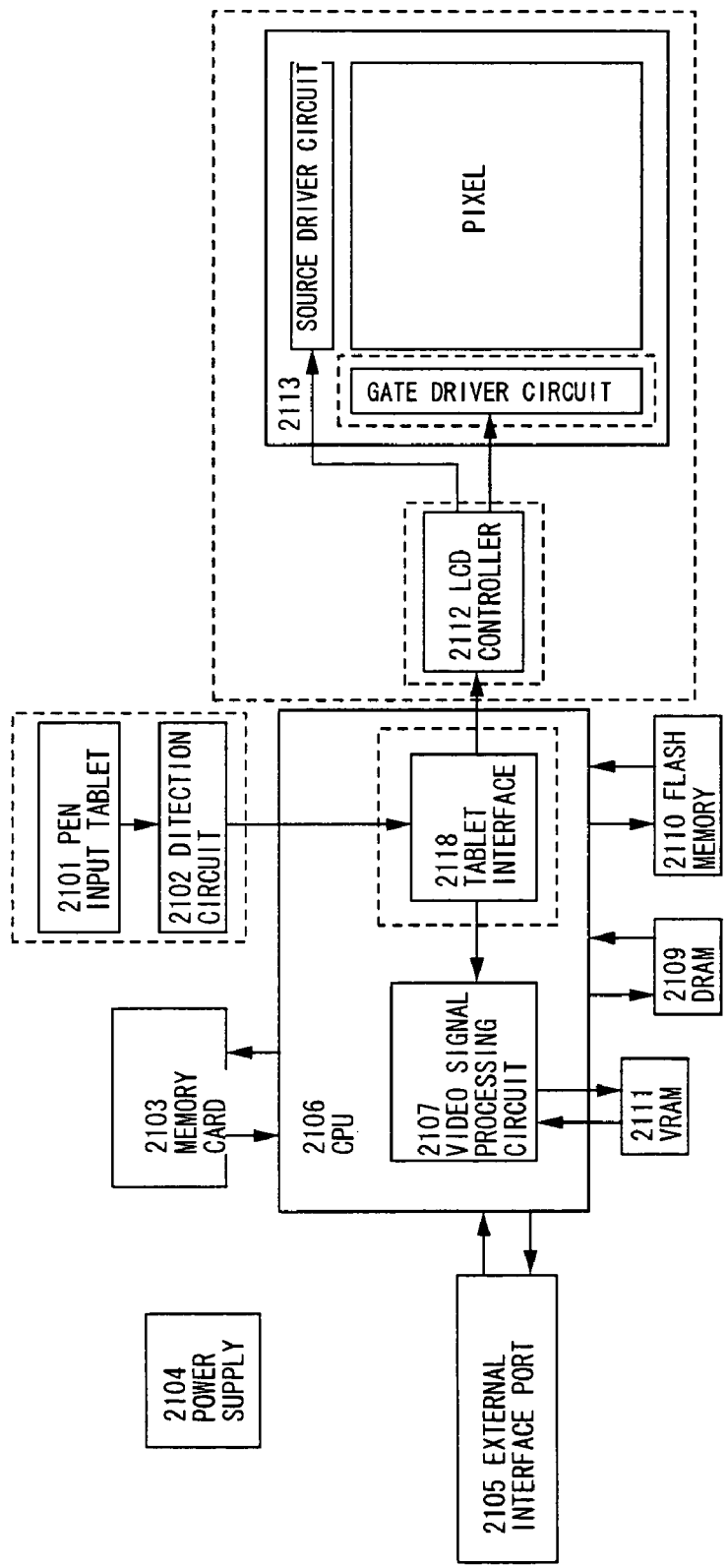
FIG. 21 is a block diagram of a portable information terminal employing the present invention.
Figure 22:
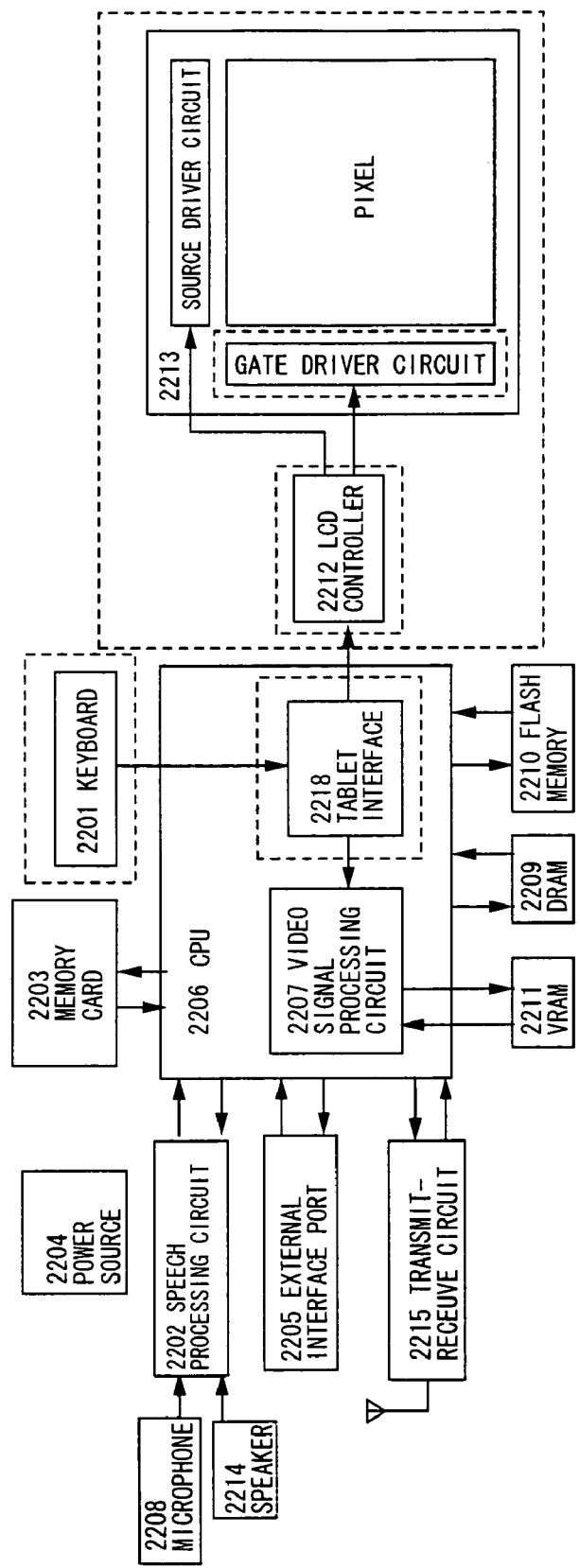
FIG. 22 is a block diagram of a cellular phone employing the present invention.
Figure 23:
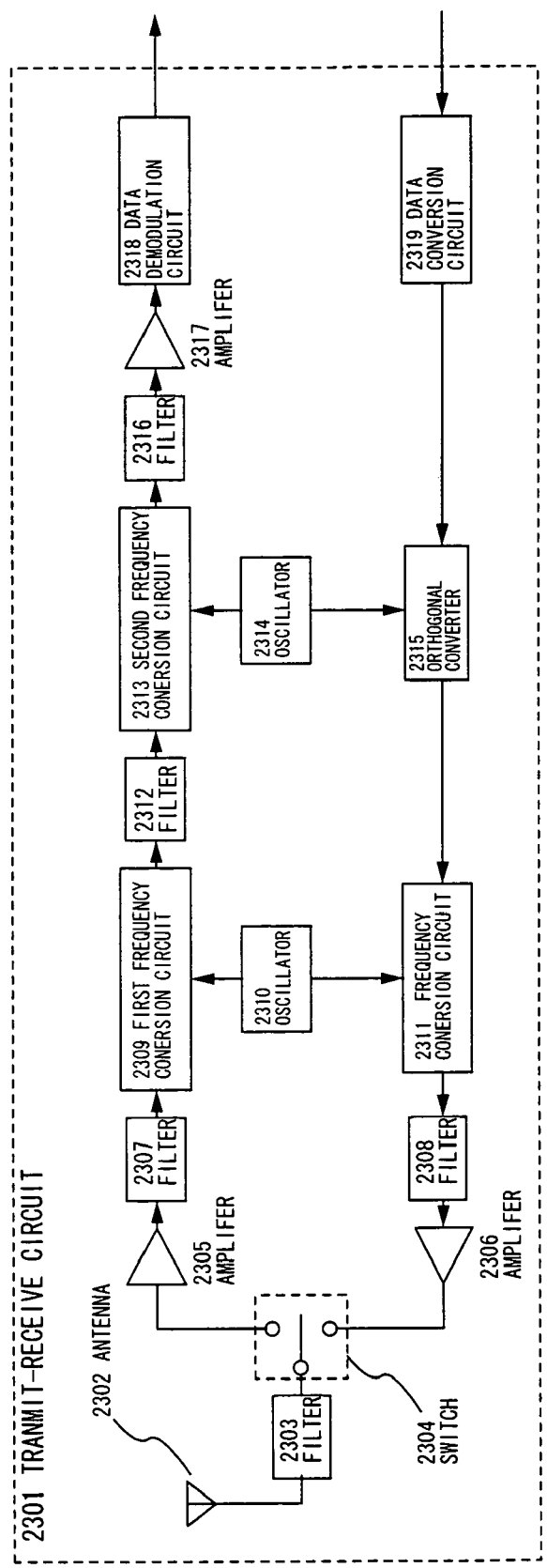
FIG. 23 is a block diagram of a transmission/reception unit of the cellular phone.

FIG. 21 shows an example of applying the present invention to a portable information terminal. In this example, a video signal processing circuit 2107 of a CPU 2106, VRAM 2111 and some other circuits stop their functions during a still image is displayed to reduce power consumption. In FIG. 21, parts which operate are indicated by dotted lines. A controller 2112 may be mounted to a display device 2113 by COG or incorporated in the display device. FIGS. 22 and 23 show an example of applying the present invention to a cellular phone. Similar to the case shown in FIG. 21, some functions can be stopped during still image display to reduce power consumption.

A plurality of memory circuits arranged in each pixel are used to store digital video signals, so that the digital video signals stored in the memory circuits can be repeatedly used for every new frame period to display a still image continuously. Thus an external circuit, a source signal line driver circuit, and other circuits can stop their operations during the still image is displayed. Furthermore, non-volatile memory circuits arranged in each pixel are used to hold digital video signals, making it possible to keep the digital video signals stored after power supply is shut off. Accordingly, the invention can greatly contribute to overall power consumption reduction of a liquid crystal display device.

What is claimed is:

1. A liquid crystal display device having a plurality of pixels, each of the plurality of pixels comprising:
    a plurality of memory circuits;
    a plurality of non-volatile memory circuits;
    a plurality of first switches, wherein each of the plurality of first switches is electrically connected to a corresponding one of the plurality of memory circuits;
    a plurality of second switches, wherein each of the plurality of second switches is electrically connected to a corresponding one of the plurality of non-volatile memory circuits;
    a plurality of third switches, wherein each of the plurality of third switches is electrically connected to a corresponding one of the plurality of memory circuits;
    a plurality of fourth switches, wherein each of the plurality of fourth switches is electrically connected to a corresponding one of the plurality of non-volatile memory circuits;
    a plurality of read transistors, wherein each of the plurality of read transistors is electrically connected to a corresponding one of the plurality of first switches, and to a corresponding one of the plurality of second switches;
    a plurality of write transistors, wherein each of the plurality of write transistors is electrically connected to a corresponding one of the plurality of third switches, and to a corresponding one of the plurality of the fourth switches; and
    a liquid crystal element electrically connected to each one of the plurality of read transistors.

2. A device according to claim 1, wherein the memory circuits are static random access memories (SRAM).

3. A device according to claim 1, wherein the memory circuits are ferroelectric random access memories (FeRAM).

4. A device according to claim 1, wherein the memory circuits are dynamic random access memories (DRAM).

5. A device according to claim 1, wherein the non-volatile memory circuits are non-volatile electrically erasable programmable read only memories (EEPROM).

6. A device according to claim 1, wherein the memory circuits are formed on a glass substrate.

7. A device according to claim 1, wherein the memory circuits are formed on a plastic substrate.

8. A device according to claim 1, wherein the memory circuits are formed on a stainless steel substrate.

9. A device according to claim 1, wherein the memory circuits are formed on a single crystal wafer.

10. An device according to claim 1, wherein the liquid crystal display device is incorporated in an electronic device.

11. An device according to claim 10, wherein the electronic device is selected from the group consisting of a television set, a personal computer, a portable terminal, a video camera, and a head mounted display.

12. A liquid crystal display device having a plurality of pixels, each of the plurality of pixels comprising:
    n×m memory circuits for storing m (m is a natural number and satisfies 1≦m) frames of n (n is a natural number and satisfies 2≦n) bit digital video signals;
    n×k non-volatile memory circuits for storing k (k is a natural number and satisfies 1≦k) frame of the n bit digital video signals;
    n first switches, wherein each of the n first switches is electrically connected to a corresponding one of the n×m memory circuits;
    n second switches, wherein each of the n second switches is electrically connected to a corresponding one of the n×k non-volatile memory circuits;
    n third switches, wherein each of the n third switches is electrically connected to a corresponding one of the n×m memory circuits;
    n fourth switches, wherein each of the n fourth switches is electrically connected to a corresponding one of the n×k non-volatile memory circuits;
    n read transistors, wherein each of the n read transistors is electrically connected to a corresponding one of the n first switches, and to a corresponding one of the n second switches;
    n write transistors, wherein each of the n write transistors is electrically connected to a corresponding one of the n third switches, and to a corresponding one of the n fourth switches; and
    a liquid crystal element electrically connected to each one of the n read transistors.

13. A device according to claim 12, wherein the memory circuits are static random access memories (SRAM).

14. A device according to claim 12, wherein the memory circuits are ferroelectric random access memories (FeRAM).

15. A device according to claim 12, wherein the memory circuits are dynamic random access memories (DRAM).

16. A device according to claim 12, wherein the non-volatile memory circuits are non-volatile electrically erasable programmable read only memories (EEPROM).

17. A device according to claim 12, wherein the memory circuits are formed on a glass substrate.

18. A device according to claim 12, wherein the memory circuits are formed on a plastic substrate.

19. A device according to claim 12, wherein the memory circuits are formed on a stainless steel substrate.

20. A device according to claim 12, wherein the memory circuits are formed on a single crystal wafer.

21. An device according to claim 12, wherein the liquid crystal display device is incorporated in an electronic device.

22. An device according to claim 21, wherein the electronic device is selected from the group consisting of a television set, a personal computer, a portable terminal, a video camera, and a head mounted display.

23. A liquid crystal display device having a plurality of pixels, each of the plural pixels comprising:
   a source signal line;
   n (n is a natural number and satisfies $2 \leq n$) writing gate signal lines;
   n reading gate signal lines;
   n writing transistors;
   n reading transistors;
   n×m memory circuits for storing m (m is a natural number and satisfies $1 \leq m$) frames of n bit digital video signals;
   n×k non-volatile memory circuits for storing k (k is a natural number and satisfies $1 \leq k$) of the n bit digital video signals;
   2n memory circuit selecting units;
   2n non-volatile memory circuit selecting units; and
   a liquid crystal element,
   wherein each gate electrode of the n writing transistors is electrically connected to one of the n writing gate signal lines, with no two gate electrodes sharing the same writing gate signal line,
   wherein each input electrode of the n writing transistors is electrically connected to the source signal line,
   wherein each output electrode of the n writing transistors is electrically connected to one of m circuits out of the n×m memory circuits through one of n units out of the 2n memory circuit selecting units, each memory circuit selecting unit making selection for no more than one output electrode,
   wherein each output electrode of the n writing transistors is electrically connected to one of k circuits out of the n×k non-volatile memory circuits through one of n units out of the 2n non-volatile memory circuit selecting units, each non-volatile memory circuit selecting unit making selection for no more than one output electrode,
   wherein each gate electrode of the n reading transistors is electrically connected to one of the n reading gate signal lines, with no two gate electrodes sharing the same reading gate signal line,
   wherein each input electrode of the n reading transistors is electrically connected to one of m circuits out of the n×m memory circuits through one of n units out of the 2n memory circuit selecting units, each memory circuit selecting unit making selection for no more than one input electrode,
   wherein each input electrode of the n reading transistors is electrically connected to one of k circuits out of the n×k non-volatile memory circuits through one of n units of the 2n non-volatile memory circuit selecting units, each non-volatile memory circuit selecting unit making selection for no more than one input electrode, and
   wherein each output electrode of the n reading transistors is electrically connected to one of electrodes of the liquid crystal element.

24. A device according to claim 23,
   wherein one of the m memory circuits is selected by one of the memory circuit selecting units, or one of the k non-volatile memory circuits is selected by one of the non-volatile memory circuit selecting unit, to communicate the selected memory circuit or non-volatile memory circuit with the output electrode of its associated writing transistor, thereby writing the digital video signals in the selected memory circuit, or
   wherein one of the m memory circuits is selected by one of the memory circuit selecting units, or one of the k non-volatile memory circuits is selected by one of the non-volatile memory circuit selecting unit, to communicate the selected memory circuit or non-volatile memory circuit with the input electrode of its associated reading transistor, thereby reading the digital video signals stored in the selected memory circuit.

25. A device according to claim 23, further comprising:
   shift registers for outputting sampling pulses sequentially in response to clock signals and start pulses;
   first latch circuits for holding n (n is a natural number and satisfies $2 \leq n$) bit digital video signals in response to the sampling pulses;
   second latch circuits for receiving the n bit digital video signals that have been held in the first latch circuits; and
   bit selecting circuits for selecting the n bit digital video signals transferred to the second latch circuits one bit by one bit to output the signals to the source signal line.

26. A device according to claim 23, wherein the memory circuits are static random access memories (SRAM).

27. A device according to claim 23, wherein the memory circuits are ferroelectric random access memories (FeRAM).

28. A device according to claim 23, wherein the memory circuits are dynamic random access memories (DRAM).

29. A device according to claim 23, wherein the non-volatile memory circuits are non-volatile electrically erasable programmable read only memories (EEPROM).

30. A device according to claim 23, wherein the memory circuits are formed on a glass substrate.

31. A device according to claim 23, wherein the memory circuits are formed on a plastic substrate.

32. A device according to claim 23, wherein the memory circuits are formed on a stainless steel substrate.

33. A device according to claim 23, wherein the memory circuits are formed on a single crystal wafer.

34. An device according to claim 23, wherein the liquid crystal display device is incorporated in an electronic device.

35. An device according to claim 34, wherein the electronic device is selected from the group consisting of a television set, a personal computer, a portable terminal, a video camera, and a head mounted display.

36. A liquid crystal display device having a plurality of pixels, each of the plural pixels comprising:
   n (n is a natural number and satisfies $2 \leq n$) source signal lines;
   a writing gate signal line;
   n reading gate signal lines;
   n writing transistors;
   n reading transistors;
   n×m memory circuits for storing m (m is a natural number and satisfies $1 \leq m$) frames of n bit digital video signals;
   n×k non-volatile memory circuits for storing k (k is a natural number and satisfies $1 \leq k$) of the n bit digital video signals;

2n memory circuit selecting units;
2n non-volatile memory circuit selecting units; and
a liquid crystal element,
wherein each gate electrode of the n writing transistors is electrically connected to the writing gate signal line,
wherein each input electrode of the n writing transistors is electrically connected to one of the n source signal lines, with no two input electrodes sharing the same source signal line,
wherein each output electrode of the n writing transistors is electrically counected to one of m circuits out of the n×m memory circuits through one of n units out of the 2n memory circuit selecting units, each memory circuit selecting unit making selection for no more than one output electrode,
wherein each output electrode of the n writing transistors is electrically connected to one of k circuits out of the n×k non-volatile memory circuits through one of n units out of the 2n non-volatile memory circuit selecting units, each non-volatile memory circuit selecting unit making selection for no more than one output electrode,
wherein each gate electrode of the n reading transistors is electrically connected to one of the n reading gate signal lines, with no two gate electrodes sharing the same reading gate signal line,
wherein each input electrode of the n reading transistors is electrically connected to one of m circuits out of the n×m memory circuits through one of n units out of the 2n memory circuit selecting units, each memory circuit selecting unit making selection for no more than one input electrode,
wherein each input electrode of the n reading transistors is electrically connected to one of k circuits out of the n×k non-volatile memory circuits through one of n units out of the 2n non-volatile memory circuit selecting units, each non-volatile memory circuit selecting unit making selection for no more than one input electrode, and
wherein each output electrode of the n reading transistors is electrically connected to one of electrodes of the liquid crystal element.

37. A device according to claim 36,
wherein one of the m memory circuits is selected by one of the memory circuit selecting units, or one of the k non-volatile memory circuits is selected by one of the non-volatile memory circuit selecting unit, to communicate the selected memory circuit or non-volatile memory circuit with the output electrode of its associated writing transistor, thereby writing the digital video signals in the selected memory circuit, or
wherein one of the m memory circuits is selected by one of the memory circuit selecting units, or one of the k non-volatile memory circuits is selected by one of the non-volatile memory circuit selecting unit, to communicate the selected memory circuit or non-volatile memory circuit with the input electrode of its associated reading transistor, thereby reading the digital video signals stored in the selected memory circuit.

38. A device according to claim 36, further comprising:
shift registers for outputting sampling pulses sequentially in response to clock signals and start pulses;
first latch circuits for holding 1 bit digital video signal out of n (n is a natural number and satisfies 2≦n) bit digital video signals in response to the sampling pulses; and
second latch circuits for receiving the 1 bit digital video signal that has been held in the first latch circuits to output the 1 bit digital video signal to the source signal lines.

39. A device according to claim 36, further comprising:
shift registers for outputting sampling pulses sequentially in response to clock signals and start pulses;
latch circuits for holding 1 bit digital video signal in response to the sampling pulses; and
bit selecting circuits for selecting one of the source signal lines in order to output the 1 bit digital video signal that has been held in the latch circuits to the selected source signal line.

40. A device according to claim 36, wherein the memory circuits are static random access memories (SRAM).

41. A device according to claim 36, wherein the memory circuits are ferroelectric random access memories (FeRAM).

42. A device according to claim 36, wherein the memory circuits are dynamic random access memories (DRAM).

43. A device according to claim 36, wherein the non-volatile memory circuits are non-volatile electrically erasable programmable read only memories (EEPROM).

44. A device according to claim 36, wherein the memory circuits are formed on a glass substrate.

45. A device according to claim 36, wherein the memory circuits are formed on a plastic substrate.

46. A device according to claim 36, wherein the memory circuits are formed on a stainless steel substrate.

47. A device according to claim 36, wherein the memory circuits are formed on a single crystal wafer.

48. A method according to claim 36, further comprising incorporating the liquid crystal display device in an electronic device.

49. A method according to claim 48, wherein the electronic device is selected from the group consisting of a television set, a personal computer, a portable terminal, a video camera, and a head mounted display.

50. A method of driving a liquid crystal display device using n (n is a natural number and satisfies 2≦n) bit digital video signals to display an image, the liquid crystal display device including a source signal line driver circuit, a gate signal line driver circuit, and a plurality of pixels,
wherein shift registers in the source signal line driver circuit output sampling pulses, which are inputted to latch circuits, which hold the digital video signals in response to the sampling pulses, the held digital video signals being written in a source signal line,
wherein gate signal line selecting pulses are outputted in the gate signal line driver circuit to select a gate signal line, and
wherein one of the following (a) through (e) is selected and conducted in pixels in the row of the selected gate signal line out of the plural pixels:
(a) the n bit digital video signals inputted from the source signal line are written in memory circuits;
(b) the n bit digital video signals stored in the memory circuits are read;
(c) the n bit digital video signals inputted from the source signal line or the n bit digital video signals stored in the memory circuits are written in non-volatile memory circuits;
(d) the n bit digital video signals stored in the non-volatile memory circuits are read; and
(e) the n bit digital video signals stored in the non-volatile memory circuits are written in the memory circuits.

51. A method according to claim 50, wherein, during a still image display period, the n bit digital video signals stored in the non-volatile memory circuits are repeatedly read to display a still image, so that the source signal line driver circuit can stop its operation.

52. A method according to claim 50, further comprising incorporating the liquid crystal display device in an electronic device.

53. A method to claim 52, wherein the electronic device is selected from the group consisting of a television set, a personal computer, a portable terminal, a video camera, and a head mounted display.

54. A liquid crystal display device having a pixel having:
- a liquid crystal element; and
- a plurality of sub-pixels, each of the plurality of sub-pixels comprising:
  - a memory circuit;
  - a non-volatile memory circuit;
  - a first switch electrically connected to the memory circuit;
  - a second switch electrically connected to the non-volatile memory circuit;
  - a third switch electrically connected to the memory circuit;
  - a fourth switch electrically connected to the non-volatile memory circuit,
  - a write transistor electrically connected to the first switch and to the second switch; and
  - a read transistor electrically connected to the third switch, to the fourth switch, and to the liquid crystal element.

* * * * *